United States Patent
Akifusa et al.

(10) Patent No.: US 8,648,924 B2
(45) Date of Patent: Feb. 11, 2014

(54) COMPUTER-READABLE STORAGE MEDIUM HAVING STORED THEREON IMAGE GENERATION PROGRAM, CAPTURING APPARATUS, CAPTURING SYSTEM, AND IMAGE GENERATION METHOD FOR GENERATING A COMBINATION IMAGE ON A DISPLAY OF THE CAPTURING APPARATUS

(75) Inventors: Yusuke Akifusa, Kyoto (JP); Naoko Mori, Kyoto (JP); Misuzu Yoshida, Kyoto (JP); Asako Kagita, Kyoto (JP); Takaya Yamane, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 107 days.

(21) Appl. No.: 13/247,348

(22) Filed: Sep. 28, 2011

(65) Prior Publication Data

US 2012/0075496 A1 Mar. 29, 2012

(30) Foreign Application Priority Data

Sep. 28, 2010 (JP) ................... 2010-217531

(51) Int. Cl.
*H04N 5/225* (2006.01)
*H04N 5/262* (2006.01)
*G06K 9/00* (2006.01)

(52) U.S. Cl.
USPC .......................... 348/218.1; 348/239; 382/118

(58) Field of Classification Search
USPC ................... 348/239, 578–601, 222.1, 218.1; 382/118, 214, 224; 715/751
See application file for complete search history.

(56) References Cited

U.S. PATENT DOCUMENTS

2009/0059061 A1* 3/2009 Yu et al. ......................... 348/347
2010/0141794 A1* 6/2010 Sakaino et al. ............. 348/231.2
2012/0005595 A1* 1/2012 Gavade et al. ................ 715/751

FOREIGN PATENT DOCUMENTS

JP 2007-280291 10/2007

* cited by examiner

*Primary Examiner* — Lin Ye
*Assistant Examiner* — Mekonnen Dagnew
(74) *Attorney, Agent, or Firm* — Nixon & Vanderhye P.C.

(57) ABSTRACT

In an exemplary capturing apparatus, a captured image is acquired in real time. A first face area is detected from a plurality of face areas included in the captured image thus acquired, and a first face image corresponding to the first face area is acquired. Then, a face combination image is generated by replacing at least a part of a second face area with the first face image.

11 Claims, 16 Drawing Sheets

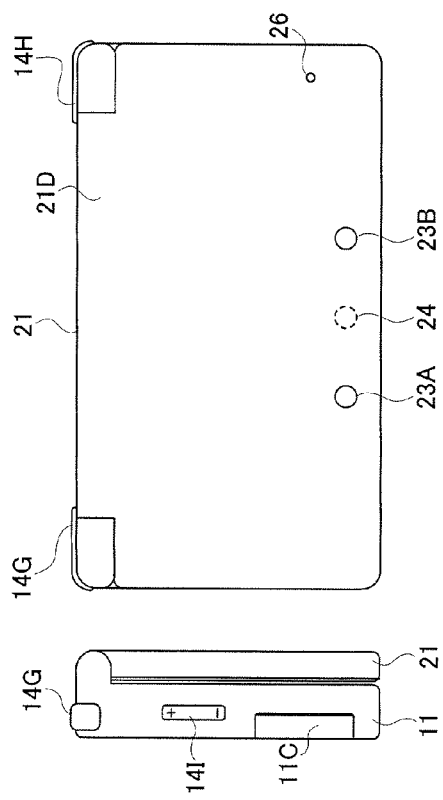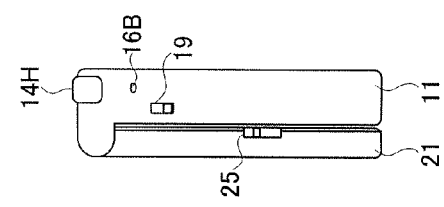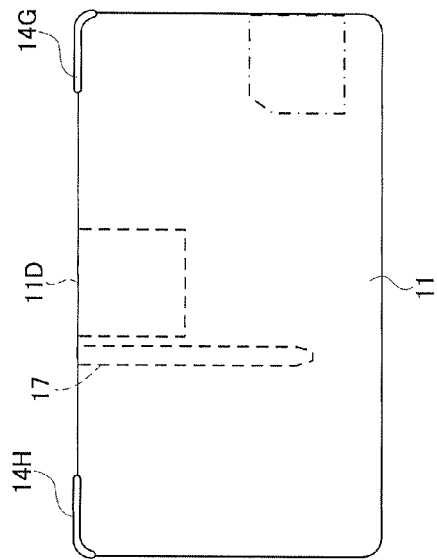

COMPUTER-READABLE STORAGE MEDIUM HAVING STORED THEREON IMAGE GENERATION PROGRAM, CAPTURING APPARATUS, CAPTURING SYSTEM, AND IMAGE GENERATION METHOD FOR GENERATING A COMBINATION IMAGE ON A DISPLAY OF THE CAPTURING APPARATUS

CROSS REFERENCE TO RELATED APPLICATION

The disclosure of Japanese Patent Application No. 2010-217531, filed on Sep. 28, 2010, is incorporated herein by reference.

TECHNICAL FIELD

The exemplary embodiments described herein relate to a computer-readable storage medium having stored thereon an image generation program to be executed by a computer of a capturing apparatus, a capturing apparatus, a capturing system, and an image generation method, and in particular, relate to a computer-readable storage medium having stored thereon an image generation program to be executed by a computer of a capturing apparatus that uses a face recognition function to perform image processing on a captured image obtained by capturing the face of a person or the like, a capturing apparatus, a capturing system, and an image generation method that use a face recognition function to perform image processing on a captured image obtained by capturing the face of a person or the like.

BACKGROUND AND SUMMARY

In recent years, capturing apparatuses have multiple functions, and there are capturing apparatuses having the function of: extracting, from a captured image obtained by capturing a person's face, feature points of the person's face; and recognizing a face. For example, an electronic camera detects from a captured image a face area corresponding to a person's face serving as a subject, and performs a process requested by a user on the face area.

Incidentally, there is a need not only for a general image processing function of the electronic camera, such as correcting the skin tone of a face, but also for an image processing function of obtaining an interesting captured image that makes photographing enjoyable.

Therefore, it is a feature of the exemplary embodiments to provide a computer-readable storage medium having stored thereon an image generation program capable of obtaining an interesting captured image, a capturing apparatus, a capturing system, and an image generation method that are capable of obtaining an interesting captured image.

One illustrative exemplary computer-readable storage medium having stored thereon an image generation program is a computer-readable storage medium having stored thereon an image generation program to be executed by a computer of a capturing apparatus, the image generation program causing the computer to function as captured image acquisition means, face image acquisition means, and face combination image generation means. The captured image acquisition means acquires a captured image in real time with at least one capturing section. The face image acquisition means detects a first face area from a plurality of face areas included in the captured image acquired by the captured image acquisition means, and acquiring an image in at least a part of the first face area as a first face image. The face combination image generation means for generating a face combination image by replacing at least a part of a second face area with the first face image, the second face area being included in the plurality of face areas and different from the first face area.

With this configuration, for example, the faces of two people are captured in real time as subjects by capturing sections, and the first face image representing at least a part of the first face area corresponding to the entire face of a first person is acquired by the face image acquisition means. Then, a face combination image obtained by replacing at least a part of the second face area corresponding to the entire face of a second person with the first face image is generated by the face combination image generation means. As a result, for example, it is possible to obtain a face combination image obtained by replacing a person's entire face with another person's face, or a face combination image obtained by replacing a part (e.g., the eyes) of a person's face with a part (the eyes, likewise) of another person's face. That is, it is possible to obtain not a captured image obtained by reproducing the faces of a plurality of people as subjects as they are, but an interesting captured image obtained by combining the faces of a plurality of people together.

It should be noted that one capturing section may be provided, or a plurality of capturing sections may be provided. In the case where one capturing section is provided, one captured image representing the faces of a plurality of people is acquired. In this case, a face combination image is generated that is obtained by combining an image in the first face area included in the one captured image, with an image in the second face area included in the same one captured image. On the other hand, in the case where, for example, two capturing sections are provided, two captured images representing the faces of a plurality of people are acquired. In this case, a face combination image is generated that is obtained by replacing the second face area included in one of the captured images, with the first face image included in the other captured image.

In addition, in the case where, for example, the faces of three people are photographed, a first face image representing at least a part of a first face area corresponding to the entire face of a first person may be acquired, and a face combination image may be generated that is obtained by replacing parts of two second face areas corresponding to the entire faces of a second person and a third person, with the first face image. In this case, the photographing of the faces of three people as subjects makes it possible to obtain a very interesting captured image in which the three people have the same face.

The computer may be further caused to function as first display control means for causing the captured image acquired in real time by the captured image acquisition means to be displayed on display means, and causing the face combination image to be displayed on the display means in place of the captured image on a condition that the face combination image has been generated by the face combination image generation means.

With this configuration, the display of a captured image obtained by faithfully reproducing the faces of a plurality of people as subjects is switched to an interesting face combination image. This enables a user of the capturing apparatus to easily confirm the face combination image by viewing the display means. For example, if the display contents of the display means are switched from the captured image to the face combination image at the time when an instruction has been given on photographing, it is possible to easily confirm the face combination image immediately after the photographing has been performed. This improves the enjoyment of photographing.

Using the captured image acquired by the at least one capturing section in accordance with a predetermined operation, a process may be performed in which the face image acquisition means acquires the first face image, and a process may be performed in which the face combination image generation means generates the face combination image.

With this configuration, when a predetermined operation has been performed to give an instruction on photographing, a series of processes, including the acquisition of the first face image and the generation of the face combination image, are performed. That is, it is possible to obtain a face combination image while performing photographing. Thus, if, for example, a face combination image is caused to be displayed on the display means immediately after the photographing has been performed, this enables a user of the capturing apparatus to further enjoy photographing.

The computer may be further caused to function as determination means and photographing prohibition means. The determination means determines, on the basis of the captured image acquired in real time by the at least one capturing section, whether or not a plurality of faces are included as subjects in a capturing range of the at least one capturing section. The photographing prohibition means, while the determination means determines that a plurality of faces are not included in the capturing range, prohibits photographing from being performed in accordance with the predetermined operation.

To generate a face combination image, it is necessary to acquire a captured image from which at least the first face area and the second face area can be detected, that is, a captured image including a plurality of face images that can be recognized as faces. With the above configuration, a plurality of people need to cooperate to perform photographing in order to obtain the face combination image. This makes it possible to enjoy photographing.

The computer may be further caused to function as notification means for, while the determination means determines that a plurality of faces are included in the capturing range, notifying that photographing can be performed in accordance with the predetermined operation.

With this configuration, the user can easily understand at what time the predetermined operation is to be performed to make a success of photographing for obtaining a face combination image, and this enables the user to smoothly perform photographing.

The computer may be further caused to function as second display control means for causing a first captured image captured by a first capturing section to be displayed in a first display area of display means, and causing a second captured image captured by a second capturing section to be displayed in a second display area of the display means, the second display area being different from the first display area.

With this configuration, captured images captured by two capturing sections are displayed separately in different display areas. This makes it possible to easily confirm whether or not faces are included in the capturing ranges of the capturing sections, and this makes it possible to smoothly perform photographing for obtaining a face combination image.

On a condition that the face combination image has been generated by the face combination image generation means, the second display control means may cause the face combination image to be displayed on the display means in place of the first captured image and the second captured image.

With this configuration, the generation of the face combination image automatically switches the display contents of the display means from the first captured image and the second captured image to the face combination image. This enables the user of the capturing apparatus to enjoy viewing the switching of the display contents. It should be noted that the face combination image may be displayed in one display area including the first display area and the second display area of the display means, or may be displayed in a display area different from the first display area and the second display area.

It is preferable that a capturing direction of either one of the first capturing section and the second capturing section should coincide with a normal direction of the display means, and a capturing direction of the other of the first capturing section and the second capturing section should coincide with a direction opposite to the normal direction.

With this configuration, a user of the capturing apparatus performs photographing in the state where the user faces another person, while confirming whether or not faces are displayed in both the first display area and the second display area. This makes it possible to further enjoy photographing.

The exemplary embodiments can also be regarded as a capturing apparatus including captured image acquisition means, face image acquisition means, and face combination image generation means. The captured image acquisition means acquires a captured image in real time with at least one capturing section. The face image acquisition means detects a first face area from a plurality of face areas included in the captured image acquired by the captured image acquisition means, and acquiring an image in at least a part of the first face area as a first face image. The face combination image generation means generates a face combination image by replacing at least a part of a second face area with the first face image, the second face area being included in the plurality of face areas and different from the first face area.

In addition, the exemplary embodiments can also be regarded as a capturing system including captured image acquisition means, face image acquisition means, and face combination image generation means. The captured image acquisition means acquires a captured image in real time with at least one capturing section. The face image acquisition means detects a first face area from a plurality of face areas included in the captured image acquired by the captured image acquisition means, and acquiring an image in at least a part of the first face area as a first face image. The face combination image generation means generates a face combination image by replacing at least a part of a second face area with the first face image, the second face area being included in the plurality of face areas and different from the first face area.

In addition, the exemplary embodiments can also be regarded as an image generation method to be performed by a capturing apparatus. In the image generation method, first, a captured image is acquired in real time by at least one capturing section. Next, a first face area is detected from a plurality of face areas included in the acquired captured image, and an image in at least a part of the first face area is acquired as a first face image. Then, a face combination image is generated by replacing at least a part of a second face area with the first face image, the second face area being included in the plurality of face areas and different from the first face area.

Based on the exemplary embodiments, it is possible to obtain not a captured image obtained by reproducing the faces of a plurality of people as subjects as they are, but an interesting captured image obtained by combining the faces of a plurality of people together.

These and other features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3A is a left side view of the game apparatus 10 in a closed state;

FIG. 3B is a front view of the game apparatus 10 in the closed state;

FIG. 3C is a right side view of the game apparatus 10 in the closed state;

FIG. 3D is a rear view of the game apparatus 10 in the closed state;

DETAILED DESCRIPTION OF NON-LIMITING EXEMPLARY EMBODIMENTS

With appropriate reference to the drawings, a description is given below of a capturing apparatus that executes an image generation program. It should be noted that the image generation program and the capturing apparatus can be applied to a given computer system. In the present embodiment, however, a description is given, by way of example, of the case where the image generation program stored in an external memory 45 is executed by a hand-held game apparatus 10 as an example of the capturing apparatus.

[Configuration of Game Apparatus 10]

Figure 1:
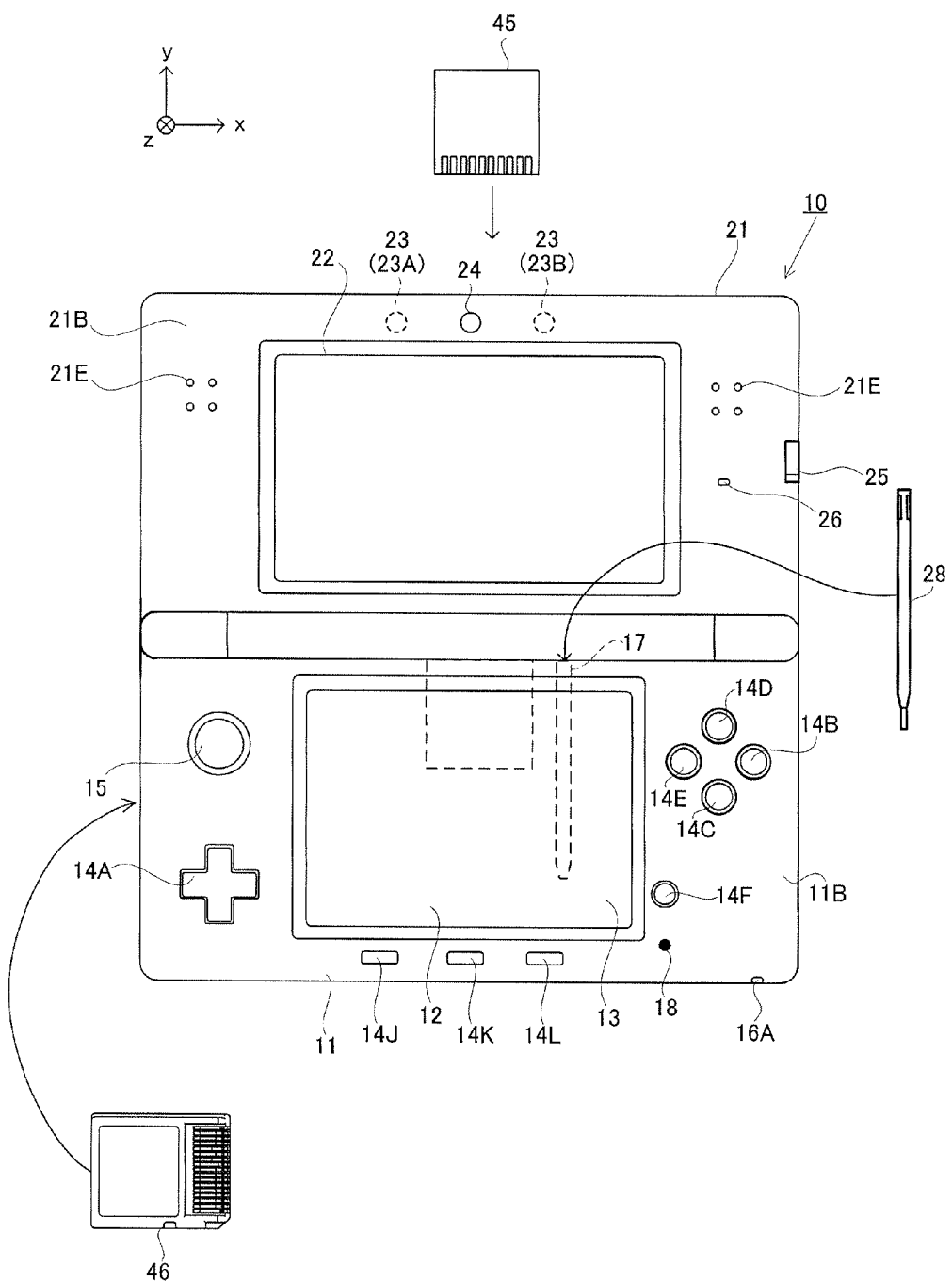
FIG. 1 is a front view of a game apparatus 10 in an open state.
Figure 2:
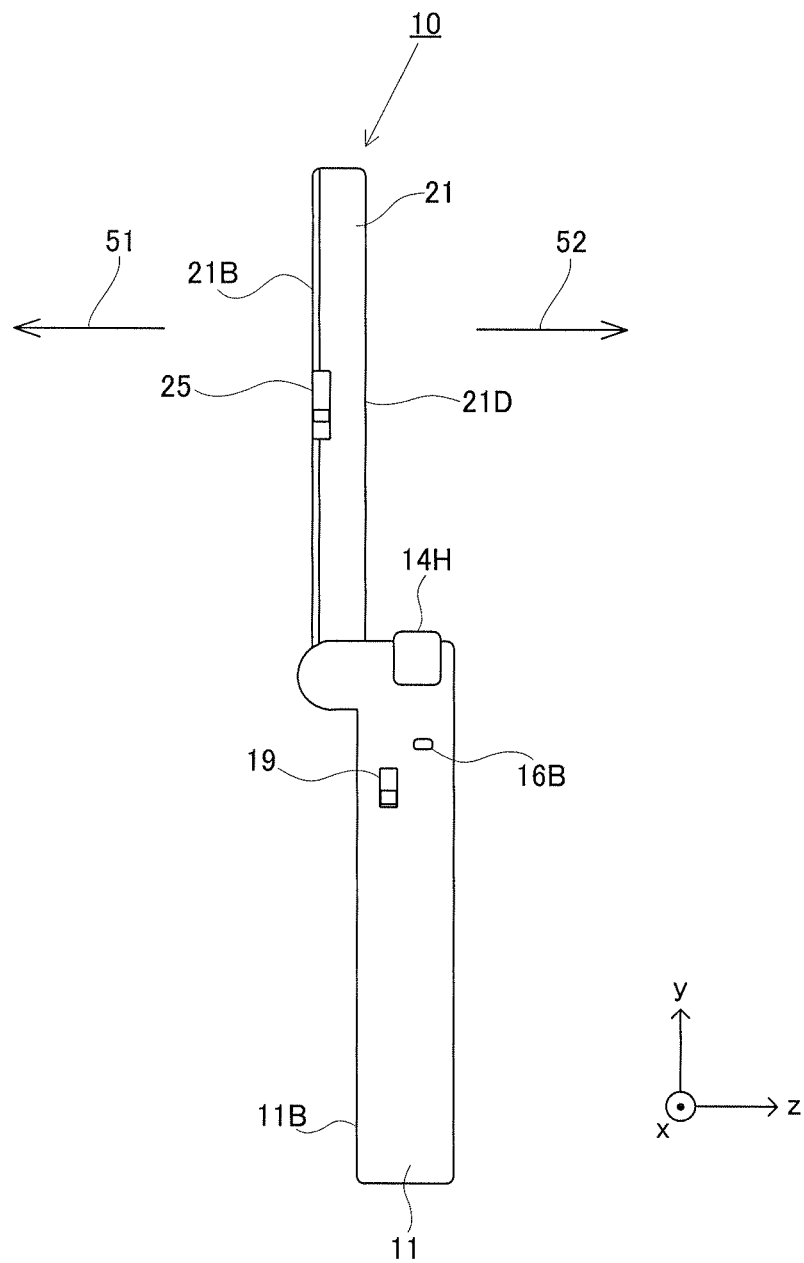
FIG. 2 is a right side view of the game apparatus 10 in the open state.

FIG. 1 is a front view of the game apparatus 10 in an open state. FIG. 2 is a right side view of the game apparatus 10 in the open state. FIG. 3A is a left side view of the game apparatus 10 in a closed state. FIG. 3B is a front view of the game apparatus 10 in the closed state. FIG. 3C is a right side view of the game apparatus 10 in the closed state. FIG. 3D is a rear view of the game apparatus 10 in the closed state.

The game apparatus 10 is capable of executing a program stored in an exchangeable memory card (an external memory 45), or a program received from a server or another game apparatus. Further, the game apparatus 10 includes a capturing section that captures an image, and is also capable of displaying and storing the captured image (hereinafter referred to as a "camera image"). It should be noted that in the following descriptions, the act of acquiring a camera image in real time with the capturing section is termed "capturing", and the act of acquiring and storing a camera image with the capturing section in accordance with an instruction from a user is termed "photographing".

The game apparatus 10 includes a lower housing 11 and an upper housing 21. The upper housing 21 is joined to the lower housing 11 so as to be openable and closable. This makes the game apparatus 10 foldable. The game apparatus 10 is used in the open state (see FIGS. 1 and 2), and is stored away in the closed state (see FIGS. 3A through 3D) when not used.

[Configuration of Lower Housing 11]

As shown in FIGS. 1 through 3D, the lower housing 11 includes a lower liquid crystal display (LCD) 12, a touch panel 13, operation buttons 14 (14A through 14L), an analog stick 15, LEDs 16A and 16B, an accommodation section 17, a microphone hole 18, and a wireless switch 19.

The lower LCD 12 includes a wider-than-high display screen that displays an image in a planar manner, and is provided at the center of an inner surface 11B of the lower housing 11. The number of pixels of the lower LCD 12 is 256 dots×192 dots (horizontal×vertical). Alternatively, another resolution may be used. It should be noted that the lower LCD 12 is not limited to an LCD, and may be another display device such as one using electroluminescence (EL).

The touch panel 13 is provided so as to cover the display screen of the lower LCD 12, and functions as coordinate input means. In the present embodiment, the touch panel 13 is a resistive touch panel. Alternatively, the touch panel may also be a touch panel of another type such as an electrostatic capacitance type.

In the accommodation section 17 (a dashed line shown in FIGS. 1 and 3D), a touch pen 28 that is used to perform an operation on the touch panel 13 is accommodated through the upper surface of the lower housing 11. It should be noted that an input may be provided on the touch panel 13 also by, for example, a finger of the user.

As shown in FIG. 1, the cross button 14A, the button 14B, the button 14C, the button 14D, the button 14E, the power button 14F, the select button 14J, the home button 14K, and the start button 14L are provided on the inner surface 11B of the lower housing 11. Further, as shown in FIGS. 3B and 3D, the L button 14G is provided at the left end portion of the upper surface of the lower housing 11, and the R button 14H is provided at the right end portion of the upper surface of the lower housing 11. Furthermore, as shown in FIG. 3A, the sound volume button 14I is provided on the left side surface of the lower housing 11. The buttons 14A through 14L are appropriately assigned functions, respectively, in accordance with the program executed by the game apparatus 10. For example, the cross button 14A is used for a selection operation and the like. For example, the L button 14G and the R button 14H are used to instruct the capturing section to capture an image.

The analog stick 15 (see FIG. 1) is a device for indicating a direction. The analog stick 15 and the cross button 14A are placed so as to be operated by the thumb of a left hand of a user holding the lower housing 11. The key top of the analog stick 15 is configured to slide parallel to the inner surface 11B of the lower housing 11, and functions in accordance with the program executed by the game apparatus 10.

The microphone hole 18 is provided on the inner surface of the lower housing 11. Underneath the microphone hole 18, a microphone 43 described later (see FIG. 4) is provided, and detects sound received through the microphone hole 18.

As shown in FIG. 3A, a cover section 11C is provided on the left side surface of the lower housing 11 so as to be openable and closable. Within the cover section 11C, a connector (not shown) is provided for attaching a data storage external memory 46 (see FIG. 1) to the game apparatus 10 in a detachable manner. While connected to the connector, the data storage external memory 46 records (stores), for example, a camera image captured by the game apparatus 10.

As shown in FIG. 3D, on the upper surface of the lower housing 11, an insertion slot 11D is provided. Within the insertion slot 11D, a connector (not shown) is provided for connecting the external memory 45, as a storage medium having stored thereon the image generation program or the like (see FIG. 1), to the game apparatus 10 in a detachable manner. The image generation program is loaded into the game apparatus 10 by connecting the external memory 45 to the connector.

As shown in FIG. 1, on the lower surface of the lower housing 11, the first LED 16A is provided. The first LED 16A notifies the user of the on/off state of the power supply of the game apparatus 10. As shown in FIG. 3C, on the right side surface of the lower housing 11, the second LED 16B is provided. The game apparatus 10 is configured to wirelessly communicate with other devices. The second LED 16B notifies the user of the establishment state of the wireless communication of the game apparatus 10. The game apparatus 10 has the function of establishing connection with a wireless LAN. The operation on the wireless switch 19 provided near the second LED 16B enables/disables the function of the wireless communication.

[Configuration of Upper Housing 21]

The upper housing 21 includes an upper LCD 22 (an example of display means), an outer capturing section 23, an inner capturing section 24, a 3D adjustment switch 25, and a 3D indicator 26.

As shown in FIG. 1, the upper LCD 22 is provided on an inner surface 21B that opposes the inner surface 11B when the game apparatus 10 is folded. The upper LCD 22 includes a wider-than-high display screen, and is provided at the center of the inner surface 21B. The number of pixels of the upper LCD 22 is 640 dots×200 dots (horizontal×vertical) in the present embodiment. Alternatively, another resolution may be used. It should be noted that the upper LCD 22 is not limited to an LCD, and may be another display device such as one using EL.

The upper LCD 22 is a display device that displays a stereoscopically visible image (stereoscopic image). The upper LCD 22 displays a left-eye image and a right-eye image, using substantially the same display region. Specifically, the upper LCD 22 displays the left-eye image and the right-eye image alternately in the horizontal direction in predetermined units (e.g., in every other line). It should be noted that the upper LCD 22 may be a display device that displays the left-eye image and the right-eye image alternately for a predetermined time. Further, the upper LCD 22 is a display device that displays an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the present embodiment, the upper LCD 22 is of a parallax barrier type. The upper LCD 22 functions as a display device that allows the user to view the left-eye image with their left eye, and the right-eye image with their right eye, using the parallax barrier. This makes it possible to display a stereoscopic image giving the user a stereoscopic effect (a stereoscopically visible image). It should be noted that the upper LCD 22 is capable of disabling the parallax barrier, and therefore is capable of displaying an image in a planar manner.

As shown in FIGS. 1 and 2, the 3D adjustment switch 25 is provided at the portion where the inner surface 11B and the right side surface of the upper housing 21 intersect each other. The 3D adjustment switch 25 includes a slider that is slidable, for example, in the up-down direction. When the slider is placed at the lowermost position, the parallax barrier of the upper LCD 22 is disabled, and an image is displayed on the upper LCD 22 in a planar manner. On the other hand, when the slider is placed above the lowermost position, an image is displayed on the upper LCD 22 in a stereoscopic manner. The amount of deviation in the horizontal direction between the position of the right-eye image and the position of the left-eye image is adjusted by changing the position of the slider, and the visibility of the stereoscopic image is adjusted.

As shown in FIG. 1, the 3D indicator 26 is provided on the inner surface 21B of the upper housing 21. The 3D indicator 26 indicates whether or not the upper LCD 22 is in the stereoscopic display mode. The 3D indicator 26 is an LED in the present embodiment, and is lit on when the upper LCD 22 is in the stereoscopic display mode (when the 3D adjustment switch 25 is placed above the lowermost position).

As shown in FIG. 3B, the outer capturing section 23 (an example of a first capturing section) is provided on an outer surface 21D of the upper housing 21 (the surface opposite to the inner surface 21B). The outer capturing section 23 includes a left outer capturing section 23A and a right outer capturing section 23B. The left outer capturing section 23A and the right outer capturing section 23B each include an imaging device (e.g., a CCD image sensor or a CMOS image sensor) having a predetermined common resolution, and a lens. The left outer capturing section 23A and the right outer capturing section 23B are provided such that when the user views the screen of the upper LCD 22 from the front thereof, the left outer capturing section 23A is placed to the left of the upper LCD 22, and the right outer capturing section 23B is placed to the right of the upper LCD 22, as shown in FIG. 1.

It should be noted that the distance between the left outer capturing section 23A and the right outer capturing section 23B is set to correspond to the distance between both eyes of a person. Capturing directions 52 (see FIG. 2) of the left outer capturing section 23a and the right outer capturing section 23b are each the same as the outward normal direction of the outer surface 21D, and are parallel to each other.

The left outer capturing section 23a and the right outer capturing section 23b can be used as a stereo camera, depending on the program executed by the game apparatus 10. When the outer capturing section 23 is used as a stereo camera, the left outer capturing section 23A captures a camera image to be viewed with the user's left eye (a left-eye image), and the right outer capturing section 23b captures a camera image to be viewed with the user's right eye (a right-eye image). This makes it possible to display a camera image captured by the outer capturing section 23 on the upper LCD 22 in a stereoscopic manner. Alternatively, either one of the left outer capturing section 23A and the right outer capturing section 23B may be used solely, so that the outer capturing section 23 can also be used as a non-stereo camera, depending on the program.

The inner capturing section 24 (an example of a second capturing section) is provided on the inner surface 21B of the upper housing 21. The inner capturing section 24 includes an imaging device (e.g., a CCD image sensor or a CMOS image sensor) having a predetermined resolution, and a lens. The inner capturing section 24 is a capturing section that captures an image in the direction opposite to that of the outer capturing section 23. That is, a capturing direction 51 of the inner capturing section 24 (see FIG. 2) coincides with the outward normal direction of the upper LCD 22. This makes it possible that when the user views the upper LCD 22 from the front thereof, the inner capturing section 24 captures the user's face.

As described above, the capturing direction 51 of the inner capturing section 24 (see FIG. 2) coincides with an normal direction of the upper LCD 22, and the capturing directions 52 of the outer capturing section 23 coincide with the direction opposite to the normal direction (see FIG. 2). Accordingly, when the user of the game apparatus 10 attempts to photograph the face of another person (hereinafter referred to as a "friend") with the outer capturing section 23 while attempting to photograph their own face with the inner capturing section 24, photographing is performed in the state where the user and the friend face each other across the upper housing 21.

Speaker holes 21E are provided on the inner surface 21B of the upper housing 21. Sound from the loudspeaker 44 described later (see FIG. 4) is output through the speaker holes 21E.

[Internal Configuration of Game Apparatus 10]

Figure 4:
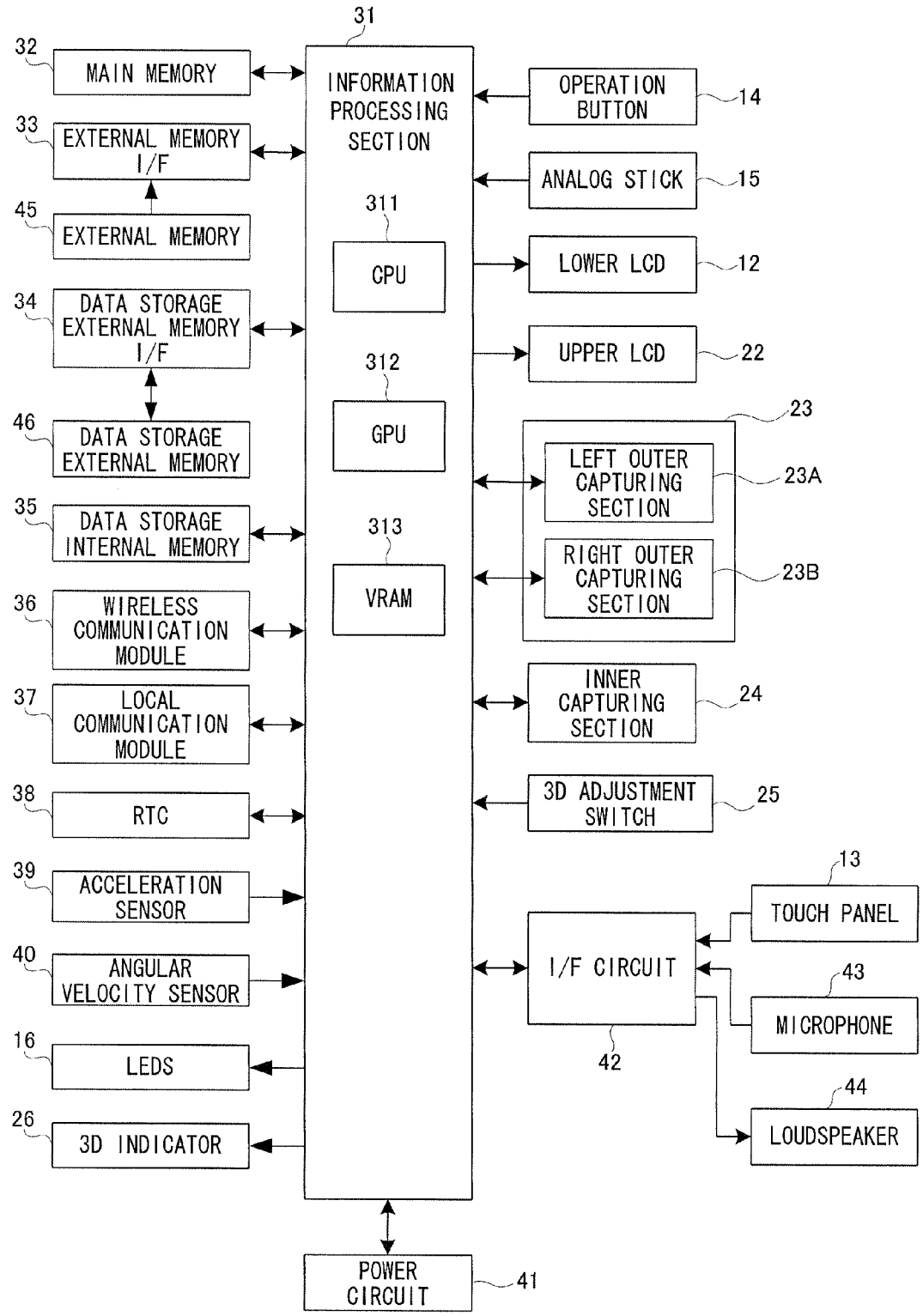
FIG. 4 is a non-limiting exemplary block diagram showing an example of the internal configuration of the game apparatus 10.

Next, with reference to FIG. 4, a description is given of the internal configuration of the game apparatus 10. Here, FIG. 4 is a non-limiting exemplary block diagram showing an example of the internal configuration of the game apparatus 10.

As shown in FIG. 4, the game apparatus 10 includes electronic components, such as an information processing section 31, a main memory 32, an external memory I/F 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an I/F circuit 42. These electronic components are mounted on electronic circuit boards, and are accommodated in the lower housing 11 (or in the upper housing 21).

The information processing section 31 is information processing means including a central processing unit (CPU) 311, a graphics processing unit (GPU) 312, and a video RAM (VRAM) 313. In the present embodiment, the image generation program is stored in the external memory 45, and the CPU 311 loads the image generation program from the external memory 45, and executes the image generation program. It should be noted that the image generation program may be acquired from another device by communication with said another device.

The GPU 312 draws an image in the VRAM 313 in accordance with an instruction from the CPU 311, and outputs the image to the upper LCD 22 and/or the lower LCD 12. Consequently, the image is displayed on the upper LCD 22 and/or the lower LCD 12.

The main memory 32 is volatile storage means (e.g., a pseudo SRAM (PSRAM)) used as a work area or a buffer area of the information processing section 31 (the CPU 311). The main memory 32 temporarily stores various types of data used for the processing performed by the information processing section 31, and also temporarily stores a program acquired from outside (the external memory 45, another device, or the like) the game apparatus 10.

The external memory I/F 33 is an interface for establishing a detachable connection with the external memory 45. The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45, and is performed by the information processing section 31.

The data storage external memory I/F 34 is an interface for establishing a detachable connection with the data storage external memory 46. The data storage external memory 46 is composed of a readable/writable non-volatile memory (e.g., a NAND flash memory). The data storage external memory 46 stores, for example, images captured by the outer capturing section 23 or the inner capturing section 24. When the data storage external memory 46 is connected to the data storage external memory I/F 34, the information processing section 31 loads an image stored in the data storage external memory 46, and is capable of causing the image to be displayed on the upper LCD 22 and/or the lower LCD 12.

The data storage internal memory 35 is composed of a readable/writable non-volatile memory (e.g., a NAND flash memory). The data storage internal memory 35 stores, for example, data and/or programs downloaded by wireless communication through the wireless communication module 36.

The wireless communication module 36 has the function of establishing connection with a wireless LAN by, for example, a method based on the IEEE 802.11.b/g standard. The local communication module 37 has the function of wirelessly communicating with another game apparatus of the same type by a predetermined communication method (e.g., infrared communication). The CPU 311 is capable of transmitting and receiving data to and from another device via the Internet, using the wireless communication module 36, and is capable of transmitting and receiving data to and from another game apparatus of the same type, using the local communication module 37.

The acceleration sensor 39 detects the magnitudes of the accelerations in the directions of straight lines (linear accelerations) along three axial (x, y, and z axes in the present embodiment) directions, respectively. As shown in FIG. 1, the longitudinal direction of the lower housing 11 is defined as an x-axis direction; the transverse direction of the lower housing 11 is defined as a y-axis direction; and the direction perpendicular to the inner surface 11B of the lower housing 11 is defined as a z-axis direction. The acceleration sensor 39 thus detects the magnitudes of the linear accelerations produced in the respective axial directions. The angular velocity sensor 40 detects the angular velocities generated about three axes (x, y, and z axes in the present embodiment) of the game apparatus 10, respectively. The CPU 311 can calculate the orientation and the motion of the game apparatus 10 on the basis of data indicating the accelerations detected by the acceleration sensor 39 and data indicating the angular velocities detected by the angular velocity sensor 40.

The RTC 38 counts time, and outputs the counted time to the information processing section 31. The information processing section 31 calculates the current time (date) on the basis of the time counted by the RTC 38. The power circuit 41 supplies power to each component of the game apparatus 10 from the power supply (e.g., the rechargeable battery accommodated in the lower housing 11) of the game apparatus 10.

A microphone 43, a loudspeaker 44, and the touch panel 13 are connected to the I/F circuit 42. The microphone 43 detects sound from the user, and outputs a sound signal to the I/F circuit 42. Specifically, the loudspeaker 44 is connected to the I/F circuit 42 through an amplifier not shown in the figures. The loudspeaker 44 outputs sound corresponding to the sound signal received from the I/F circuit 42 via the amplifier not shown in the figures. The I/F circuit 42 includes a sound control circuit that controls the microphone 43 and the loudspeaker 44 (amplifier). The sound control circuit performs A/D conversion and D/A conversion on the sound signal, and converts the sound signal into sound data in a predetermined format. The I/F circuit 42 also includes a touch panel control circuit that controls the touch panel 13. The touch panel control circuit generates touch position data in a predetermined format on the basis of a signal from the touch panel 13, and outputs the touch position data to the information processing section 31. The touch position data indicates the coordinates of the position (touch position) at which an input has been provided on the input surface of the touch panel 13. It should be noted that the touch panel control circuit reads a signal from the touch panel 13, and generates the touch position data, once in a predetermined time. The CPU 311 acquires the touch position data, and thereby recognizes the touch position, at which the input has been provided on the touch panel 13.

Operation data is output to the information processing section 31, the operation data indicating the states of the operations of the respective operation buttons 14A through 14L. The CPU 311 of the information processing section 31 determines the presence or absence of the operation of each of the operation buttons 14A through 14L on the basis of the operation data, and performs predetermined processes corresponding to the operated operation buttons 14.

The lower LCD 12 and the upper LCD 22 each display an image in accordance with an instruction from the information processing section 31 (the GPU 312). The information processing section 31 causes a stereoscopic image (stereoscopically visible image) using a left-eye image and a right-eye image to be displayed on the upper LCD 22, the images captured by the outer capturing section 23, for example.

The 3D adjustment switch 25 outputs an electrical signal corresponding to the position of the slider to the information processing section 31. In response to this, the information processing section 31 (the CPU 311) sets the display mode of the upper LCD 22 on the basis of the electrical signal from the 3D adjustment switch 25. Further, the information processing section 31 controls whether or not the 3D indicator 26 is to be lit on.

It should be noted that the hardware configuration described above is provided merely for illustrative purposes, and the configuration of the game apparatus 10 can be appropriately changed.

[Overview of Photographing For Obtaining Face Combination Image]

Next, with reference to FIGS. 5 through 11, a description is given of the steps until a face combination image (see FIG. 9) is obtained from camera images obtained by performing photographing with the outer capturing section 23 and the inner capturing section 24 as a result of the information processing section 31 executing the image generation program. Here, the face combination image is an image obtained by replacing a face image included in the camera image obtained by performing photographing with one of the outer capturing section 23 and the inner capturing section 24, with a face image included in the camera image obtained by performing photographing with the other of the outer capturing section 23 and the inner capturing section 24. In the present embodiment, a description is given, by way of example, of the case where an image obtained by replacing a face image included in the camera image obtained by performing photographing with the outer capturing section 23 (the image in a face area 92 in FIG. 11), with a face image included in the camera image obtained by performing photographing with the inner capturing section 24 (the image in a face area 91 in FIG. 11) is obtained as the face combination image.

Figure 5:
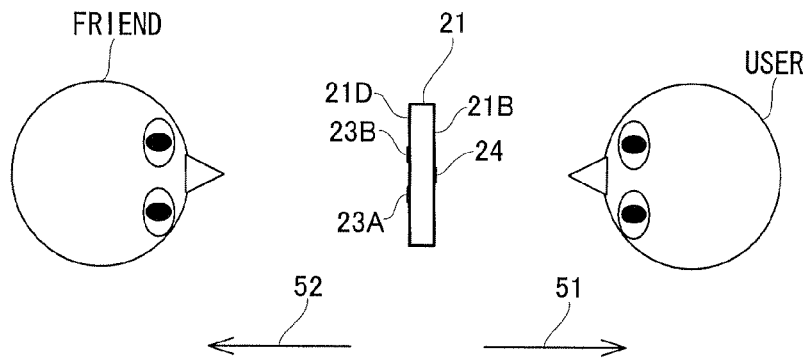
FIG. 5 is a non-limiting exemplary diagram illustrating a photographing method using the game apparatus 10.

FIG. 5 is a non-limiting exemplary diagram illustrating photographing performed using the game apparatus 10. To obtain a face combination image, it is necessary to perform photographing so as to obtain at least two face images that can be recognized as faces. Accordingly, as shown in FIG. 5, a user gives an instruction on photographing by pressing, for example, the R button 14H while holding the game apparatus 10, such that the user's own face is photographed by the inner capturing section 24 and the face of a friend is photographed by the outer capturing section 23 (the left outer capturing section 23A and the right outer capturing section 23B). Consequently, a camera image including a face image of the user is acquired by the inner capturing section 24, and a camera image including a face image of the friend is acquired by the outer capturing section 23. As described above, the performance of photographing so as to acquire at least two face images enables a process of generating a face combination image.

Figure 6:
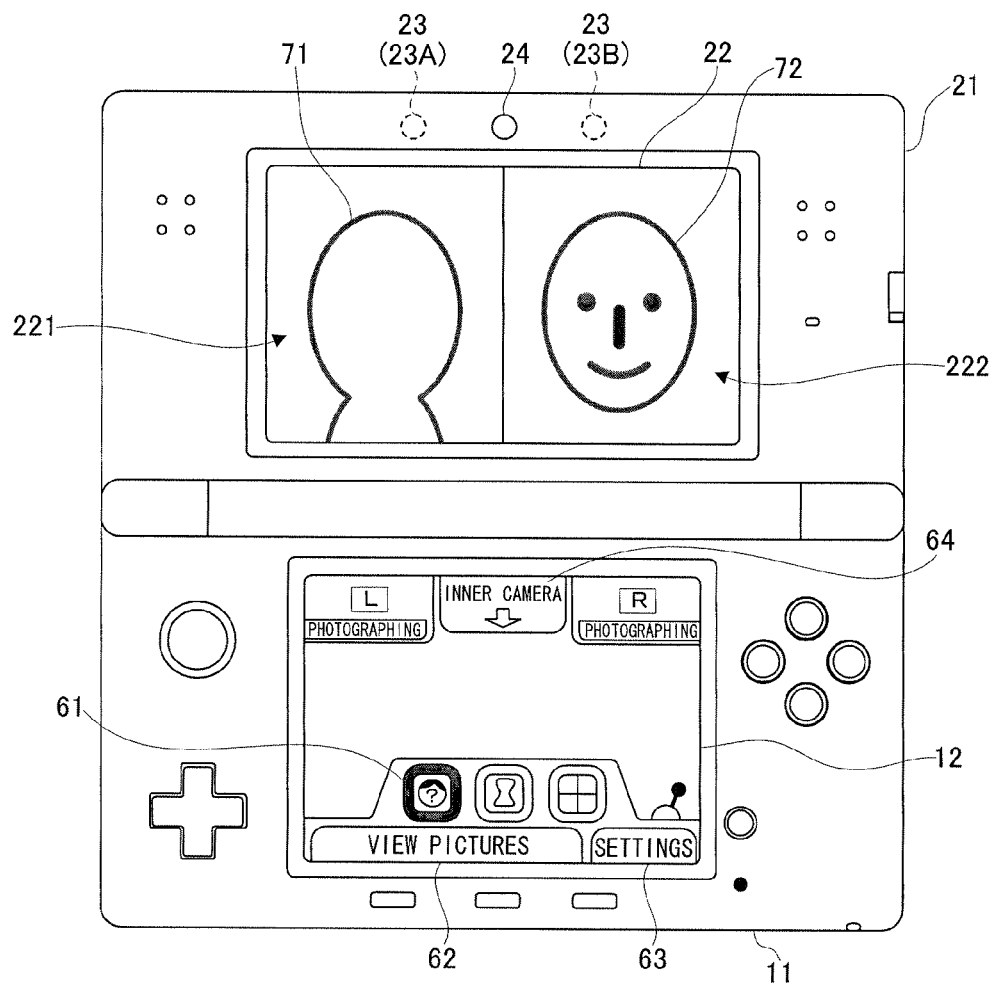
FIG. 6 is a non-limiting exemplary diagram showing an example of display of an upper LCD 22 and a lower LCD 12.

FIG. 6 is a non-limiting exemplary diagram showing an example of display of the upper LCD 22 and the lower LCD 12. When the game apparatus 10 has made a transition to a photographing mode for obtaining a face combination image, an operation screen including buttons 61 through 64 is displayed on the lower LCD 12. The buttons 61 through 64 are images associated with predetermined processes, respectively. The user can cause the information processing section 31 to perform the predetermined processes by arbitrarily selecting the buttons 61 through 64 displayed on the lower LCD 12. When the touch panel 13 has been touched by the touch pen 28, the button placed at the touch position (the button 61 in FIG. 6) is highlighted (e.g., by contour enhancement). Then, when the touch pen 28 placed on the button has been separated from the touch panel 13, the highlight of the button is canceled, and the process corresponding to the button is performed.

The button 61 is a button for causing the game apparatus 10 to make a transition to the state where photographing for obtaining a face combination image can be performed. Although described later, when the button 61 has been selected, camera images acquired in real time by the outer capturing section 23 and the inner capturing section 24 are displayed together with frames 71 and 72, respectively, on the upper LCD 22 (see FIG. 7).

The button 62 is a button for browsing face combination images obtained by the game apparatus 10. When the button 62 has been selected, thumbnail images of face combination images stored in, for example, the data storage external memory 46 are displayed as a list on the lower LCD 12. The user can select a desired thumbnail image in this state, and thereby can cause the face combination image corresponding to the thumbnail image to be displayed on the upper LCD 22. The button 63 is a button for giving an instruction to change various settings concerning photographing performed using the outer capturing section 23 and the inner capturing section 24.

The button 64 is a button for switching between a replacement face image and a face image to be replaced. In the example shown in FIG. 6, the button 64 is displayed on the lower LCD 12 as a button including the words "inner camera". When photographing has been performed in this state, a face combination image (e.g., a face combination image 80 in FIG. 9) is generated that is obtained by replacing a face image included in the camera image obtained by performing photographing with the outer capturing section 23, with a face image included in the camera image obtained by performing photographing with the inner capturing section 24. That is, a face combination image obtained by replacing the friend's face with the user's face is obtained. On the other hand, when the user has performed an operation using the touch pen 28 to select the button 64, the button 64 is displayed on the lower LCD 12 as a button including the words "outer camera". When photographing has been performed in this state, a face combination image is generated that is obtained by replacing a face image included in the camera image obtained by performing photographing with the inner capturing section 24, with a face image included in the camera image obtained by performing photographing with the outer capturing section 23. That is, a face combination image obtained by replacing the user's face with the friend's face is obtained.

On the upper LCD 22, camera images are displayed that are acquired in real time by the outer capturing section 23 and the inner capturing section 24, respectively, before photographing. In the present embodiment, the display area of the upper LCD 22 is divided into two areas, namely a left area 221 (an example of a first display area) and a right area 222 (an example of a second display area). The camera image captured by the outer capturing section 23 (a first captured image) is displayed on the left area 221, and the camera image captured by the inner capturing section 24 (a second captured image) is displayed on the right area 222. Further, on the display screen of the upper LCD 22, the frame 71 is displayed at a predetermined position in the left area 221, and the frame 72 is displayed at a predetermined position in the right area 222.

Incidentally, to generate a face combination image, it is necessary that it is possible to acquire a face image that can be recognized as a face as a result of the success of a face recognition process performed on the camera image captured by the outer capturing section 23, and that it is possible to acquire a face image that can be recognized as a face as a result of the success of a face recognition process performed on the camera image captured by the inner capturing section 24. Accordingly, it is preferable that when photographing is performed using the outer capturing section 23 and the inner capturing section 24, the photographing should be performed in the state where the user's face is placed at a central portion of the capturing range of the inner capturing section 24, and the friend's face is placed at a central portion of the capturing range of the outer capturing section 23. This makes it possible to obtain a face combination image by performing photographing in the state where the friend's face captured by the outer capturing section 23 and displayed in the left area 221 is placed within the frame 71, and the user's face captured by the inner capturing section 24 and displayed in the right area 222 is placed within the frame 72. That is, the user and the friend cooperate to perform photographing in the state where they face each other, and thereby can obtain the face combination image 80 (see FIG. 9) that is obtained by replacing the friend's face with the user's face and that is very interesting.

Figure 7:
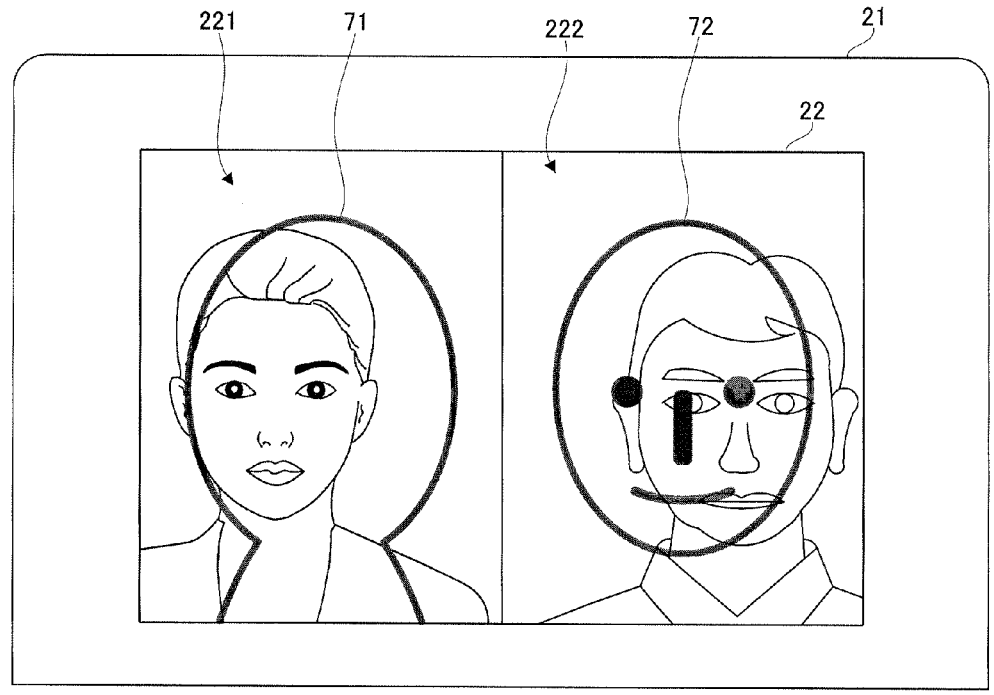
FIG. 7 is a screen view of the upper LCD 22 showing an example of images displayed on the upper LCD 22 when face recognition processes have not been successful.
Figure 8:
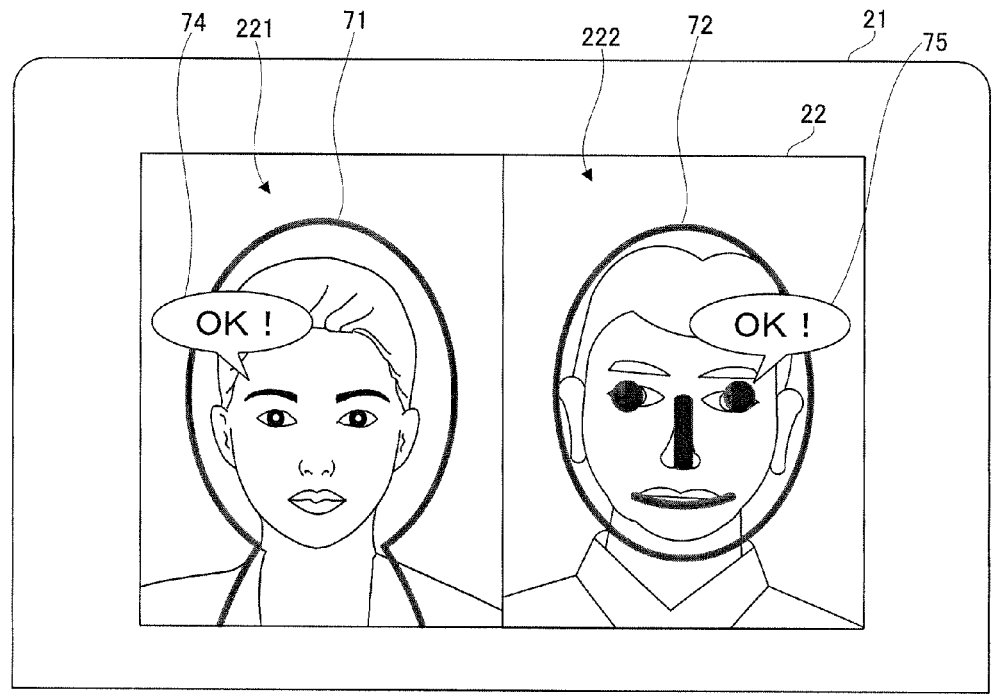
FIG. 8 is a screen view of the upper LCD 22 showing an example of images displayed on the upper LCD 22 when face recognition processes have been successful.

FIG. 7 is a screen view of the upper LCD 22 showing an example of images displayed on the upper LCD 22 when the face recognition processes have not been successful. FIG. 8 is a screen view of the upper LCD 22 showing an example of images displayed on the upper LCD 22 when the face recognition processes have been successful. It should be noted that in the screen views in FIG. 7 and thereafter, the backgrounds of the people in the camera images obtained by performing capturing with the outer capturing section 23 and the inner capturing section 24 are not shown.

As described above, to obtain a face combination image, it is necessary to obtain two camera images including face images that can be recognized as faces, using the outer capturing section 23 and the inner capturing section 24, respectively. Accordingly, the game apparatus 10 is configured not to perform photographing even if the user has operated the L button 14G or the R button 14H, unless the face recognition processes have been performed on two camera images acquired in real time by the outer capturing section 23 and the inner capturing section 24, and face recognition has been successful in both camera images, before an instruction is given on photographing. In other words, the game apparatus 10 is configured to prohibit photographing from being performed until face recognition has been successful in both the camera image acquired by the outer capturing section 23 and the camera image acquired by the inner capturing section 24. Such a configuration of the game apparatus 10 makes it possible to prevent the problem that a face combination image cannot be obtained even though photographing has been performed.

Incidentally, the game apparatus 10 is configured not to permit photographing unless face recognition has been successful in the two camera images. This makes it necessary to allow the user to easily understand that face recognition has not been successful, or face recognition has been successful. In response, in the present embodiment, as shown in FIG. 8, when face recognition has been successful in the camera image acquired by the outer capturing section 23 (hereinafter referred to as an "outer camera image"), a balloon 74 including the word "OK!" is displayed in the left area 221. Further, when face recognition has been successful in the camera image acquired by the inner capturing section 24 (hereinafter referred to as an "inner camera image"), a balloon 75 including the word "OK!" is displayed in the right area 222. The balloons 74 and 75 are displayed on the upper LCD 22 only when face recognition has been successful, and are deleted from the upper LCD 22 when face recognition has not been successful (see FIG. 7). This enables the user of the game apparatus 10 to make a success of photographing by adjusting the positions of the user's own face and the friend's face relative to the game apparatus 10 so that the balloon 74 is displayed in the left area 221 and the balloon 75 is displayed in the right area 222, and then giving an instruction on photographing.

Figure 9:
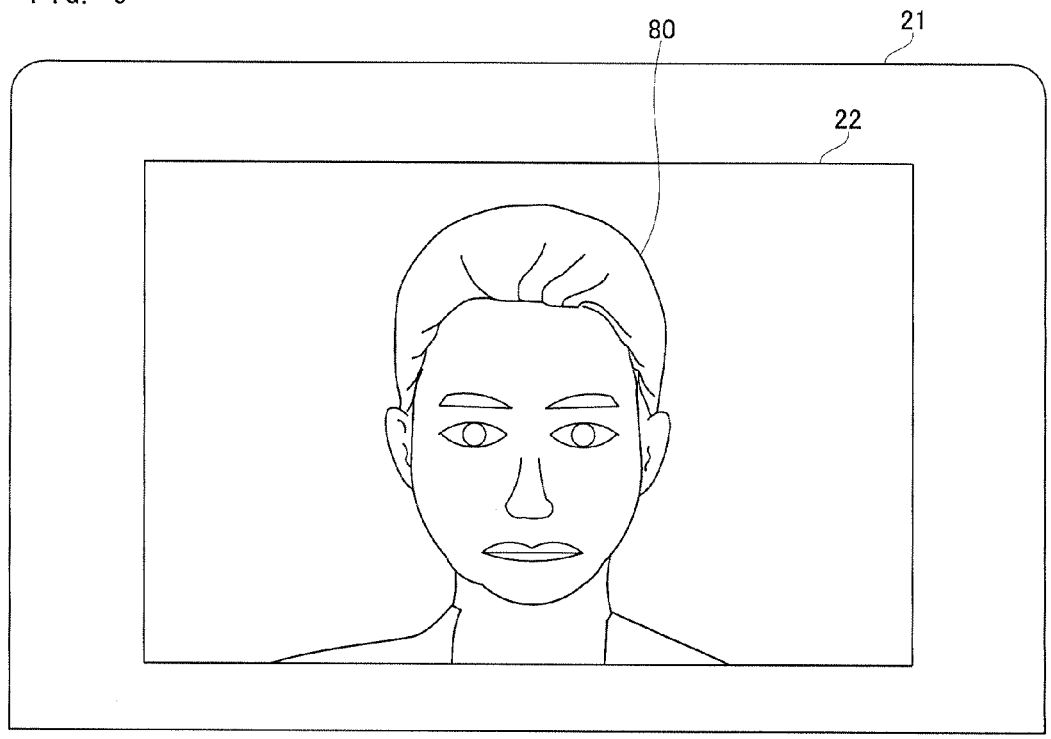
FIG. 9 is a screen view of the upper LCD 22 showing an example of a face combination image 80 displayed on the upper LCD 22 immediately after photographing has been successful.
Figure 10:
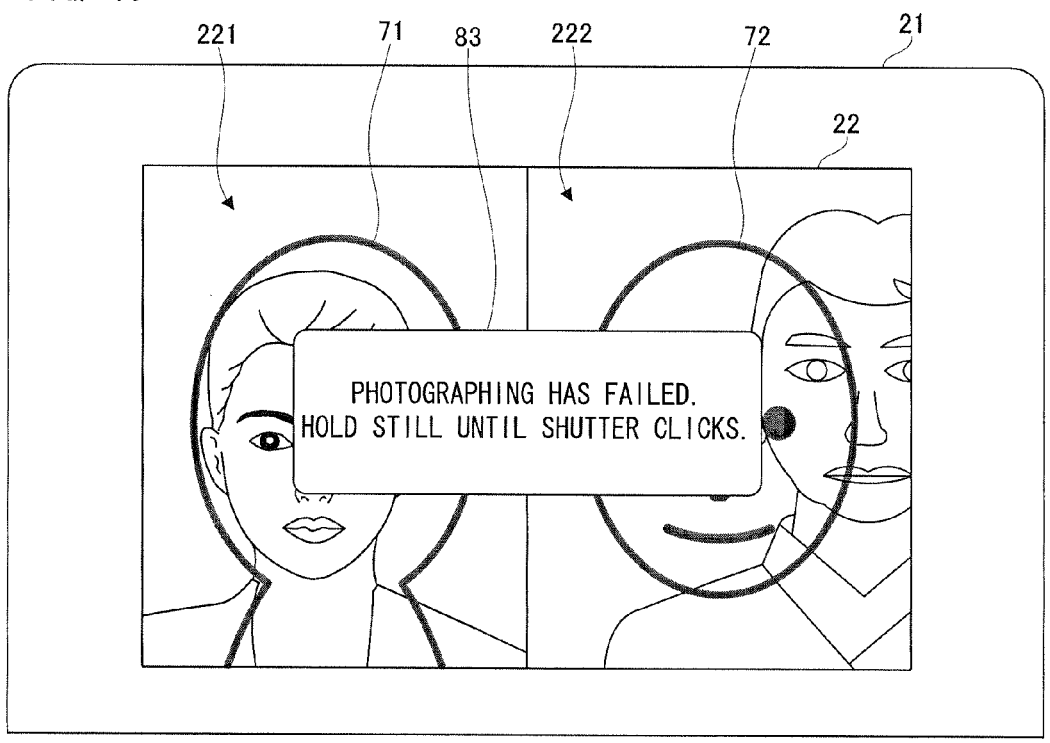
FIG. 10 is a screen view of the upper LCD 22 showing an example of an error message 83 displayed on the upper LCD 22 immediately after photographing has failed.

FIG. 9 is a screen view of the upper LCD 22 showing an example of the face combination image 80 displayed on the upper LCD 22 immediately after photographing has been successful. FIG. 10 is a screen view of the upper LCD 22 showing an example of an error message 83 displayed on the upper LCD 22 immediately after photographing has failed.

When photographing has been performed in the state where face recognition in the outer camera image and face recognition in the inner camera image had been successful, the face combination image 80 is, as shown in FIG. 9, displayed on the upper LCD 22 instead of the outer camera image and the inner camera image acquired in real time (see FIG. 7, for example). As described above, the state where camera images obtained by faithfully reproducing the user's face and the friend's face placed in real space are displayed on the upper LCD 22 changes to the state where an image that is not present in real space and that is obtained by replacing the friend's face with the user's face is displayed on the upper LCD 22. This enables the user and the friend to enjoy photographing.

On the other hand, even if the user has given an instruction on photographing in the state where face recognition has been successful immediately before photographing and the balloons 74 and 75 are displayed on the upper LCD 22, the positions of the faces may be shifted significantly by, for example, moving the game apparatus 10 at the time for performing photographing. In this case, faces may not be recognized in the two camera images, and photographing may fail. In response, in the present embodiment, in such a case, the error message 83 is displayed on the upper LCD 22 as exemplified in FIG. 10. In response, photographing may be performed again in the state where the positions of the user's face and the friend's face relative to the game apparatus 10 are fixed to some extent (the state where the balloons 74 and 75 remain displayed on the upper LCD 22), whereby it is possible to make a success of the photographing.

[Overview of Face Combination Process]

Figure 11:
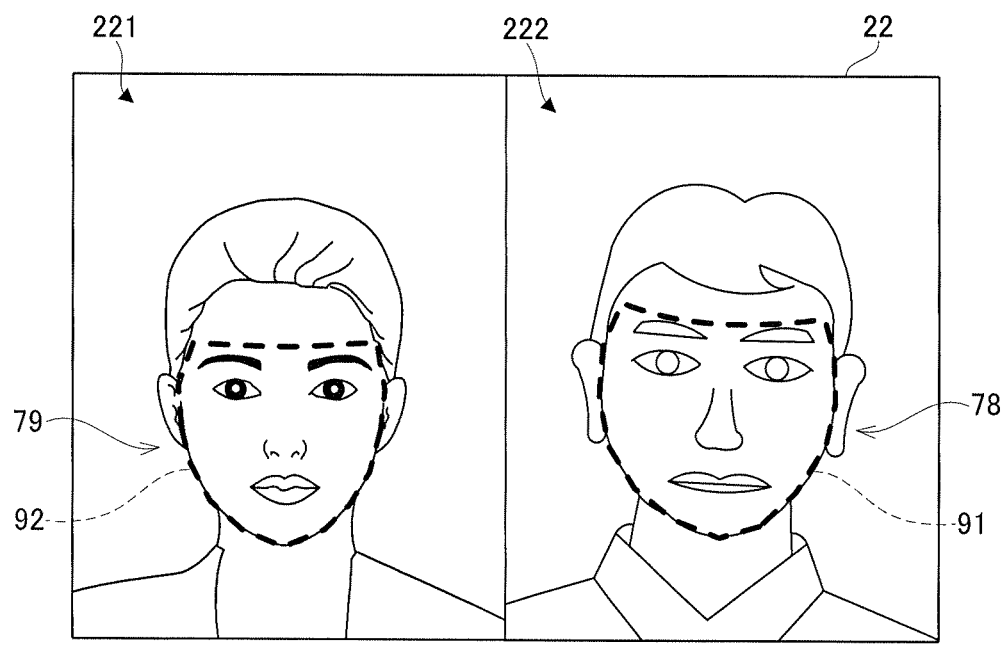
FIG. 11 is a screen view of the upper LCD 22 exemplifying two face areas 91 and 92 included in camera images displayed on the upper LCD 22.
Figure 12:
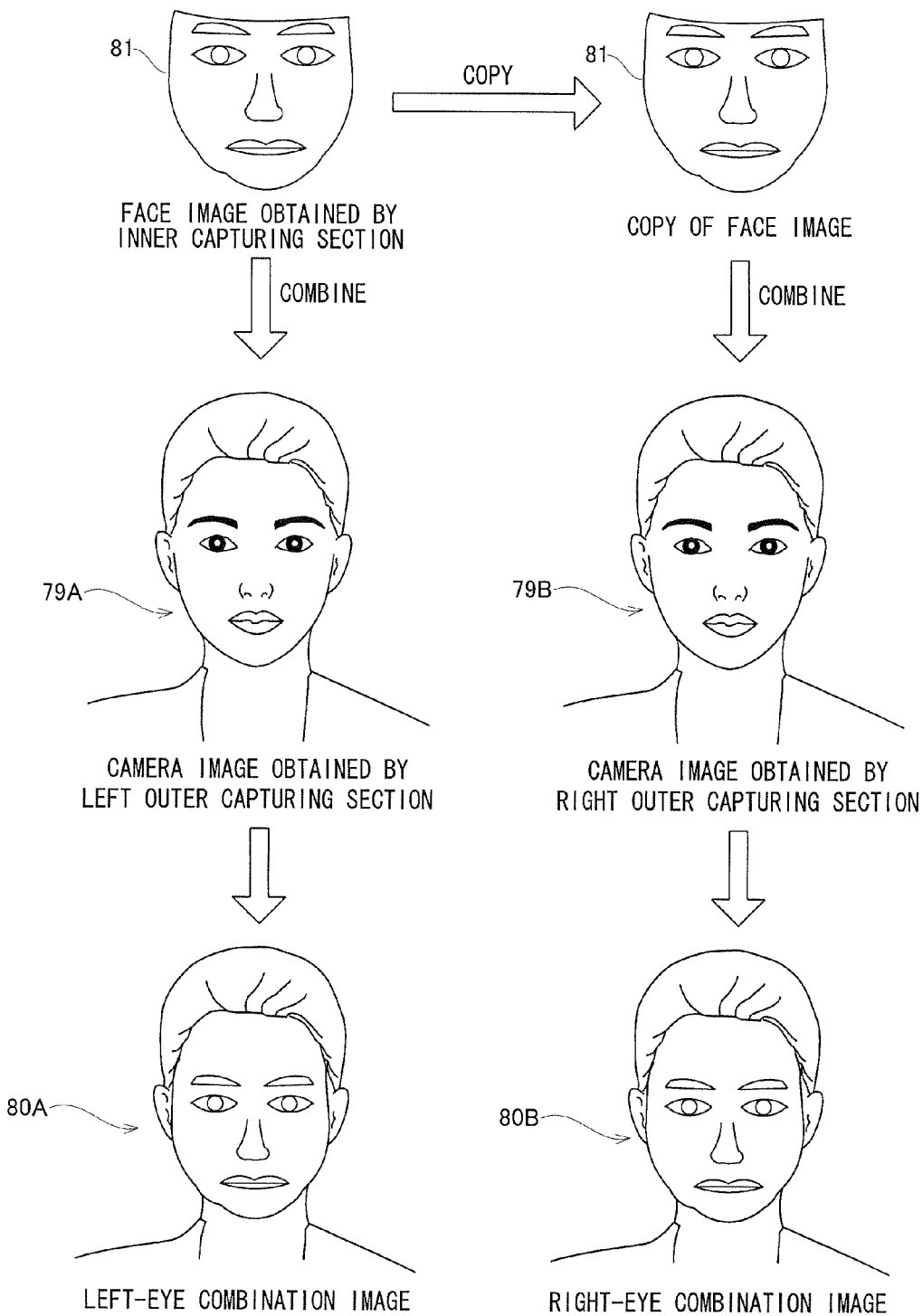
FIG. 12 is a non-limiting exemplary diagram illustrating an overview of a face combination process.

With reference to FIGS. 11 and 12, a description is given below of an overview of a process of obtaining the face combination image 80 using two camera images. Here, FIG. 11 is a screen view of the upper LCD 22 exemplifying the two face areas 91 and 92 included in camera images displayed on the upper LCD 22. FIG. 12 is a non-limiting exemplary diagram illustrating an overview of a face combination process. Before photographing for obtaining the face combination image 80 is performed, two camera images acquired in real time by the outer capturing section 23 and the inner capturing section 24, respectively, are displayed side by side on the upper LCD 22 (see FIG. 8, for example). When the user has given an instruction on photographing in this state, the face recognition processes are performed on two camera images 78 and 79, respectively, obtained by photographing (see FIG. 11). Then, on the basis of the results of the face recognition processes, two face areas, namely the face area 91 and the face area 92, are detected as shown in FIG. 11, the face area 91 corresponding to the user's face (an example of a first face area) and the face area 92 corresponding to the friend's face (an example of a second face area), the user's face and the friend's face included in the two camera images 78 and 79, respectively, displayed on the upper LCD 22. Then, an image in the face area 91 is acquired as a first face image 81 (see FIG. 12).

Incidentally, the outer capturing section 23 includes the left outer capturing section 23A and the right outer capturing section 23B, and therefore, two outer camera images 79A and 79B each including a face image of the friend (see FIG. 12) are acquired by the outer capturing section 23. Accordingly, to cause the face combination image 80, obtained by replacing the face image of the friend with a face image of the user, to be displayed in a stereoscopic manner, it is necessary to combine the first face image 81 with each of the outer camera image 79A acquired by the left outer capturing section 23A and the outer camera image 79B acquired by the right outer capturing section 23B, the camera images 79A and 79B included in the outer camera image 79.

In response, when the first face image 81 has been acquired, the first face image 81 is copied as shown in FIG. 12. Then, a left-eye combination image 80A is generated that is obtained by, in the outer camera image 79A acquired by the left outer capturing section 23A, placing the first face image 81 in the face area 92 (see FIG. 11) corresponding to the friend's face included in the outer camera image 79A. Accordingly, a right-eye combination image 80B is generated that is obtained by, in the camera image 79B acquired by the right outer capturing section 23B, placing a copy of the first face image 81 in the face area 92 (see FIG. 11) corresponding to the friend's face included in the camera image 79B. The left-eye combination image 80A and the right-eye combination image 80B thus generated are displayed on the upper LCD 22, whereby the face combination image 80 obtained by replacing the friend's face with the user's face is displayed on the upper LCD 22 in a stereoscopic manner. It should be noted that the face area 91 and the face area 92 are different from each other in size, and the user's face and the friend's face are different from each other in inclination. Thus, actually, an enlargement/reduction process and a rotation process are performed on the first face image 81. These processes will be described in detail later.

[Memory Map]

Figure 13:
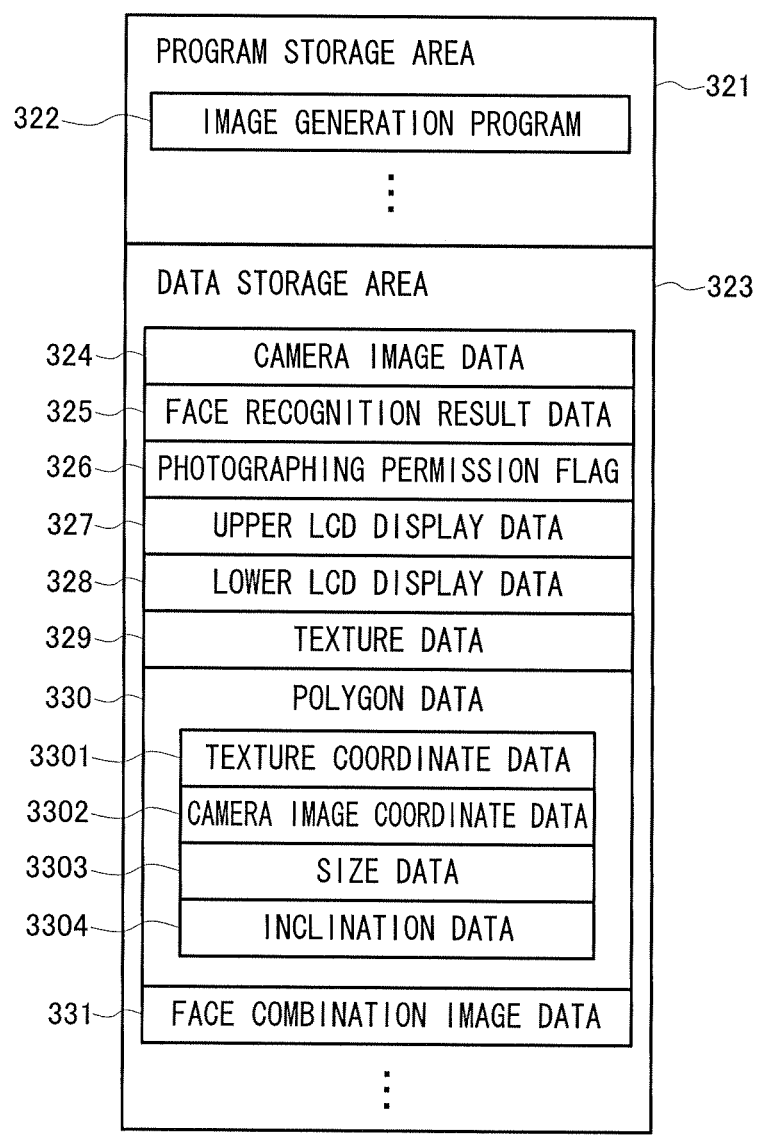
FIG. 13 is a non-limiting exemplary memory map of a main memory 32.

With reference to FIG. 13, a description is given below of data stored in the main memory 32. Here, FIG. 13 is a non-limiting exemplary memory map of the main memory 32. As exemplified in FIG. 13, the main memory 32 includes a program storage area 321 and a data storage area 323. In the program storage area 321, programs to be executed by the CPU 311 are stored. In the data storage area 323, various data is stored that is necessary for the processing for obtaining a face combination image. The programs stored in the program storage area 321 and part of the data stored in the data storage area 323 are data stored in advance in the external memory 45 and loaded into the main memory 32 to perform the processing for obtaining a face combination image.

In the program storage area 321, an image generation program 322 and the like are stored. The image generation program 322 is a program for causing the information processing section 31 to perform a series of processes shown in FIGS. 14 and 15 described later.

In the data storage area 323, the following are stored: camera image data 324; face recognition result data 325; a photographing permission flag 326; upper LCD display data 327; lower LCD display data 328; texture data 329; polygon data 330; face combination image data 331; and the like.

The camera image data 324 indicates captured images captured by the outer capturing section 23 and the inner capturing section 24, respectively (an outer camera image and an inner camera image). To perform photographing for obtaining a face combination image, both the outer capturing section 23 and the inner capturing section 24 are used in the present embodiment. Accordingly, the camera image data 324 is updated using the outer camera image captured by the outer capturing section 23 and the inner camera image captured by the inner capturing section 24. The update cycle of the camera image data 324 may be the same as the unit of time in which the game apparatus 10 performs processing (e.g., 1/60 seconds), or may be different from this unit of time. It should be noted that the camera image data 324 includes, as well as data of an outer camera image and an inner camera image acquired so as to be displayed on the upper LCD 22 before photographing, data of an outer camera image and an inner camera image obtained by photographing (see FIG. 11). The data of the outer camera image and the inner camera image is updated each time photographing is performed.

The face recognition result data 325 indicates the results of the face recognition processes sequentially performed on the camera images indicated by the camera image data 324. The face recognition result data 325 includes, for example: data indicating whether or not recognition of peoples' faces has been successful by performing the face recognition processes on the outer camera image and the inner camera image, respectively; and data indicating the areas in which recognition of faces has been successful in the camera images (e.g., the face areas 91 and 92). When the face recognition result data 325 includes data indicating that recognition of the face of a friend has been successful in the outer camera image, the balloon 74 (see FIG. 8) is displayed in the left area 221 of the upper LCD 22 as described above. Further, when the face recognition result data 325 includes data indicating that recognition of the user's face has been successful in the inner camera image, the balloon 75 (see FIG. 8) is displayed in the right area 222 of the upper LCD 22 as described above. The face recognition result data 325 is appropriately updated each time the face recognition process is performed on a camera image.

The photographing permission flag 326 is data indicating whether or not photographing is permitted as a result of the success of the face recognition processes. When the face recognition result data 325 includes data indicating that recognition of peoples' faces has been successful in the face recognition processes, the photographing permission flag 326 is set to ON. In the present embodiment, when the face recognition result data 325 includes data indicating that recognition of peoples' faces has been successful in both the outer camera image and the inner camera image, the photographing permission flag 326 is set to "ON". When the photographing permission flag 326 is set to "ON", photographing is performed in accordance with the operation on the L button 14G or the R button 14H. On the other hand, when the face recognition result data 325 includes data indicating that recognition of a person's face has not been successful in the face recognition process performed on either one of the outer camera image and the inner camera image, the photographing permission flag 326 is set to "OFF". When the photographing permission flag 326 is set to "OFF", photographing is not performed even if the L button 14G or the R button 14H has been operated.

The upper LCD display data 327 is data concerning images displayed on the upper LCD 22. The upper LCD display data 327 includes data of: an outer camera image acquired in real time by the outer capturing section 23; an inner camera image acquired in real time by the inner capturing section 24; images representing the frames 71 and 72; images representing the balloons 74 and 75; an image of the error message 83; and the like.

The lower LCD display data 328 is data concerning images displayed on the lower LCD 12. The lower LCD display data 328 includes data of images of the buttons 61 through 64 (see FIG. 6), and the like.

The texture data 329 indicates a face texture that is used to represent the first ace image 81 (see FIG. 12) on an outer camera image using texture mapping. In the present embodiment, the texture data 329 is generated on the basis of an image in the face area 91 (see FIG. 11) included in the inner camera image 78 acquired by the inner capturing section 24 when photographing has been performed.

The polygon data 330 is data concerning a plurality of polygons PG1 (see FIG. 18) and a plurality of polygons PG2 (see FIG. 20) that are generated on the basis of feature points of faces recognized in the face recognition processes. Here, the polygons PG1 are a plurality of polygons generated on the basis of feature points P1 through P16 (see FIG. 17) of a face recognized in the face recognition process performed on the inner camera image 78. The polygons PG2 are a plurality of polygons generated on the basis of feature points P21 through P36 (see FIG. 19) of a face recognized in the face recognition process performed on the outer camera image 79. It should be noted that in the present embodiment, a description is given of the case where the plurality of polygons PG1 are generated on the basis of the feature points P1 through P16, and the plurality of polygons PG2 are generated on the basis of the feature points P21 through P36. Alternatively, the plurality of polygons PG1 and PG2 may be generated using, for example, mouth central points A4 and B4 (see FIGS. 17 and 19) described later, instead of the feature points P1 and P21 on the respective noses. The polygon data 330 includes texture coordinate data 3301, camera image coordinate data 3302, size data 3303, inclination data 3304, and the like.

The texture coordinate data 3301 indicates the texture coordinates at which all the vertices of the polygons PG1 are placed, and the texture coordinates at which all the vertices of the polygons PG2 are placed. The camera image coordinate data 3302 indicates the camera image coordinates corresponding to all the vertices of the polygons PG1, and the camera image coordinates corresponding to all the vertices of the polygons PG2. The size data 3303 includes data indicating a horizontal size X1 and a vertical size Y1 (see FIG. 17) of the face area 91, and a horizontal size X2 and a vertical size Y2 (see FIG. 19) of the face area 92. Here, the horizontal size X1 indicates the distance between a left-eye central point A1 and a right-eye central point A2 of the face indicated by the face area 91. The vertical size Y1 indicates the distance between: a midpoint A3 of a line segment a connecting the central point A1 and the central point A2; and the mouth central point A4. In the present embodiment, the size of the face area 91 is represented by the horizontal size X1 and the vertical size Y1. Further, the horizontal size X2 indicates the distance between a left-eye central point B1 and a right-eye central point B2 of the face indicated by the face area 92. The vertical size Y2 indicates the distance between: a mid point B3 of a line segment β connecting the central point B1 and the central point B2; and the mouth central point B4. In the present embodiment, the size of the face area 92 is represented by the horizontal size X2 and the vertical size Y2. The inclination data 3304 indicates the inclination of the face indicated by the face area 91 with respect to the horizontal direction (the inclination of the line segment α shown in FIG. 17), and the inclination of the face indicated by the face area 92 with respect to the horizontal direction (the inclination of the line segment f3 shown in FIG. 19). It should be noted that in the present embodiment, the coordinates of the points A1 through A4 and B1 through B4 are used only to obtain the sizes and the inclinations of the face areas 91 and 92, but may also be used to generate the plurality of polygons PG1 and PG2 (see FIGS. 18 and 20).

The face combination image data 331 is data of a face combination image obtained in the face combination process (e.g., the left-eye face combination image 80A and the right-eye face combination image 80B shown in FIG. 12). When the process of generating a face combination image has been completed, the face combination image indicated by the face combination image data 331 is displayed on the upper LCD 22 as part of the upper LCD display data 327 for a predetermined time.

It should be noted that although not shown in FIG. 13, in the data storage area 323, the following are also stored: operation data indicating the content of the operation performed on the game apparatus 10; data concerning the control of a virtual camera for displaying the appearance of a virtual game space on a screen; and the like. These items of data, however, are not directly related to the exemplary embodiments, and are not described in detail here.

[Main Process]

Figure 14:
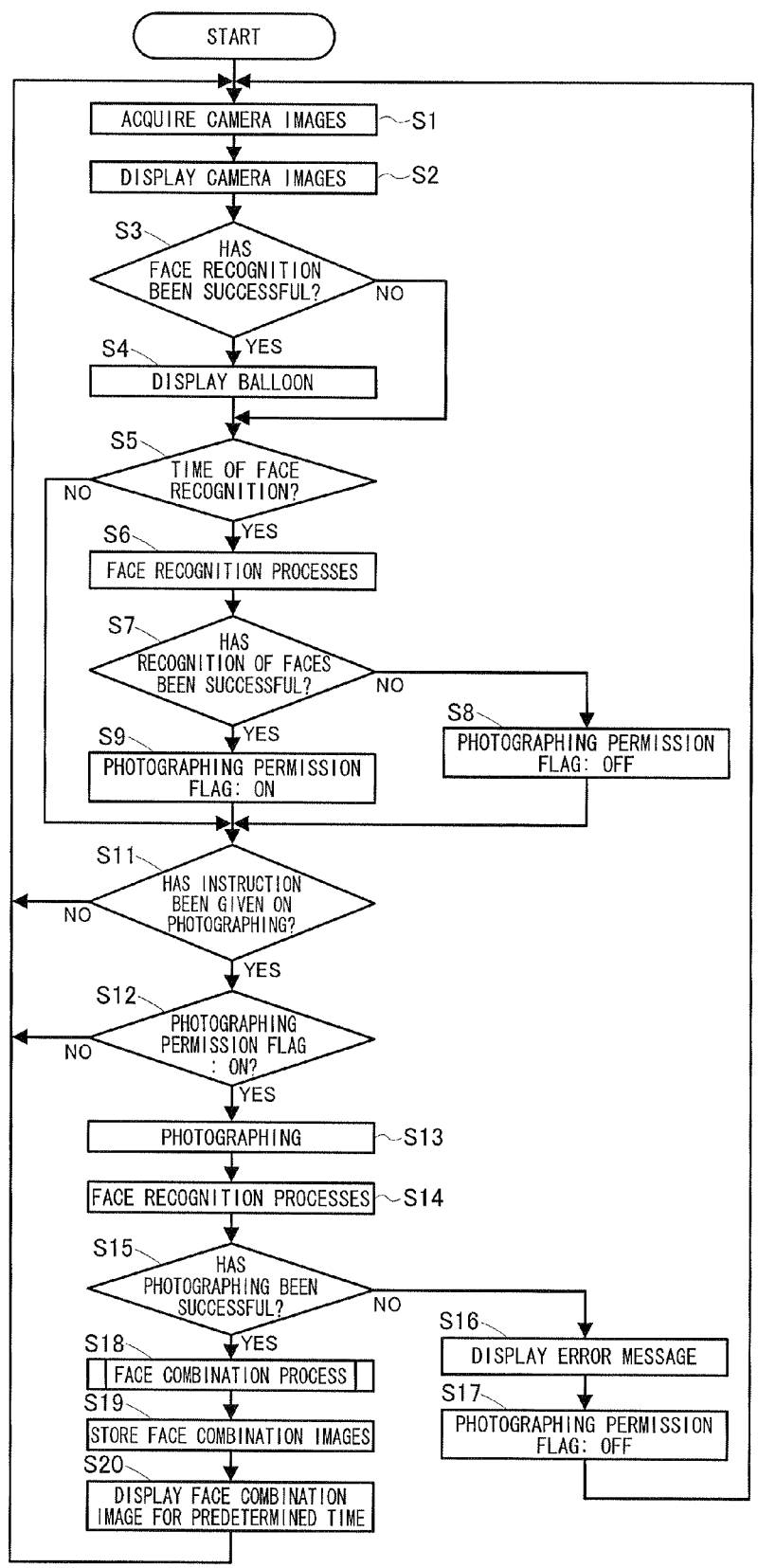
FIG. 14 is a non-limiting exemplary flow chart showing an example of processing performed by the game apparatus 10 to generate a face combination image.

Next, with reference to FIG. 14, a description is given of a main process performed by the information processing section 31. Here, FIG. 14 is a non-limiting exemplary flow chart showing an example of processing performed by the game apparatus 10 to generate a face combination image. It should be noted that a series of processes described below are performed in accordance with commands issued by the CPU 311 on the basis of the image generation program 322.

When the user has performed a predetermined operation to cause the game apparatus 10 to make a transition to a photographing mode for obtaining a face combination image, the CPU 311 acquires camera images as shown in FIG. 14 (step S1). Specifically, the information processing section 31 acquires an inner camera image captured by the inner capturing section 24 and an outer camera image captured by the outer capturing section 23, to thereby update the camera image data 324. Then, the information processing section 31, which functions as first display control means and second display control means, causes the acquired camera images to be displayed on the upper LCD 22 (step S2). Specifically, the CPU 311 instructs the GPU 312 to display the camera images acquired in the process of step S1. In response to this, the GPU 312 draws the outer camera image and the inner camera image, the frames 71 and 72, and the like in the VRAM 313, and outputs the drawn images to the upper LCD 22. Consequently, for example, as shown in FIG. 7, the outer camera image is displayed together with the frame 71 in the left area 221 of the upper LCD 22, while the inner camera image is displayed together with the frame 72 in the right area 222.

As described above, the information processing section 31 acquires an outer camera image in real time with the outer capturing section 23, and causes the outer camera image to be displayed in the left area 221 of the upper LCD 22. The information processing section 31 also acquires an inner camera image in real time with the inner capturing section 24, and causes the inner camera image to be displayed in the right area 222 of the upper LCD 22.

Next, the information processing section 31 determines, with reference to the face recognition result data 325 stored in the data storage area 323, whether or not face recognition has already been successful in the outer camera image or the inner camera image (step S3). When the information processing section 31 has determined that face recognition has not been successful (step S3: NO), that is, when face recognition has failed in the outer camera image and face recognition has also failed in the inner camera image, the processing proceeds to step S5 described later. In such a case, as exemplified in FIG. 7, no balloons are displayed on the upper LCD 22.

On the other hand, when having determined that face recognition has been successful in the outer camera image or the inner camera image (step S3: YES), the information processing section 31, which functions as notification means, causes a balloon to be displayed on the upper LCD 22 (step S4). In step S4, if face recognition has been successful in the outer camera image, the CPU 311 causes the GPU 312 to perform a process of causing the balloon 74 (see FIG. 8) to be displayed in the left area 221 of the upper LCD 22. On the other hand, if face recognition has been successful in the inner camera image, the CPU 311 causes the GPU 312 to perform a process of causing the balloon 75 (see FIG. 8) to be displayed in the right area 222 of the upper LCD 22. As described above, while determining that a plurality of faces (here, the user's face and the friend's face) are included in the outer capturing section 23 and the inner capturing section 24, respectively, the information processing section 31 causes the two balloons 74 and 75 to be displayed on the upper LCD 22, to thereby notify the user that photographing can be performed.

Subsequently, the CPU 311 determines, on the basis of time information output from the RTC 38, whether or not the time for performing the face recognition processes has arrived (step S5). When the CPU 311 has determined that the time for performing the face recognition processes has not arrived (step S5: NO), the processing proceeds to step S11 described later. On the other hand, when having determined that the time for performing the face recognition processes has arrived (step S5: YES), the CPU 311 performs predetermined face recognition processes (step S6). When having performed the face recognition processes, the CPU 311 updates the face recognition result data 325 in accordance with the results of the processes. It should be noted that the face recognition processes are a known process, and therefore are not described in detail in the present specification.

When having performed the process of step S6, the CPU 311, which functions as determination means, determines, with reference to the face recognition result data 325, whether or not recognition of peoples' faces has been successful in both the outer camera image and the inner camera image acquired in the process of step S1 (step S7). Here, if recognition of a person's face has not been successful in either one of the outer camera image and the inner camera image, it is not possible to generate a face combination image. In response, when having determined that recognition of a person's face has not been successful in either one of the outer camera image and the inner camera image (step S7: NO), the CPU 311, which functions as photographing prohibition means, sets the photographing permission flag 326 to "OFF" (step S8). On the other hand, when having determined that recognition of peoples' faces has been successful in both the outer camera image and the inner camera image (step S7: YES), the CPU 311 sets the photographing permission flag 326 to "ON" (step S9).

As described above, the CPU 311 determines, on the basis of an outer camera image and an inner camera image acquired in real time by the outer capturing section 23 and the inner capturing section 24, respectively, whether or not a plurality of faces serving as subjects are included in the capturing ranges of the outer capturing section 23 and the inner capturing section 24. Then, while determining that a plurality of faces are not included in the capturing ranges of the outer capturing section 23 and the inner capturing section 24, the CPU 311 sets the photographing permission flag 326 to "OFF" to thereby prohibit photographing from being performed in accordance with the operation on the L button 14G or the R button 14H.

When having performed the process of step S8, or when having performed the process of step S9, or when having determined in step S5 that the time for performing the face recognition processes has not arrived (step S5: NO), the CPU 311 determines, on the basis of whether or not the L button 14G or the R button 14H has been operated, whether or not an instruction has been given on photographing (step S11). When the CPU 311 has determined that an instruction has not been given on photographing (step S11: NO), the processing returns to step S1, and the processes of step S1 and thereafter are repeated until an instruction is given on photographing.

When having determined that an instruction has been given on photographing (step S11: YES), the CPU 311 determines whether or not the photographing permission flag 326 is set to "ON" (step S12). When the CPU 311 has determined that the photographing permission flag 326 is not set to "ON" (step S12: NO), the processing returns to step S1. It should be noted that in the present embodiment, when the photographing permission flag is set to "OFF", the processing returns to step S1. Alternatively, when the photographing permission flag is set to OFF, the processing may return to step S1, for example, after a predetermined error sound is output from the loudspeaker 44 in order to notify the user that recognition of peoples' faces has not been successful.

When having determined that the photographing permission flag 326 is set to "ON" (step S12: YES), the CPU 311, which functions as captured image acquisition means, performs photographing with the outer capturing section 23 and the inner capturing section 24 (step S13), to thereby update the camera image data 324 using the outer camera image 79 and the inner camera image 78 obtained by the photographing. Then, the CPU 311, which functions as face image acquisition means, performs the face recognition processes in a similar manner to the process of step S6 on the outer camera image 79 and the inner camera image 78, respectively, obtained by the photographing (step S14). As a result of the success of the face recognition processes in step S14, as exemplified in FIG. 11, the face area 91 is detected from the inner camera image 78, while the face area 92 is detected from the outer camera image 79. Thus, an image in the face area 91 is acquired as the first face image 81 (see FIG. 12). It should be noted that in step S14, the face recognition result data 325 is updated in accordance with the results of the face recognition processes.

Subsequently to the process of step S14, the information processing section 31 determines whether or not the photographing has been successful (step S15). Specifically, the CPU 311 determines, with reference to the face recognition result data 325, whether or not recognition of the faces of two or more people (the user's face and the friend's face in the present embodiment) has been successful in the process of step S14, in both the outer camera image 79 and the inner camera image 78 obtained in the process of step S13.

When having determined that the photographing has not been successful (step S15: NO), that is, when recognition of a person's face has not been successful in either one of the outer camera image 79 and the inner camera image 78, the information processing section 31 controls, as exemplified in FIG. 10, the GPU 312 to cause the error message 83 included in the upper LCD display data 327 to be displayed on the upper LCD 22 (step S16), and sets the photographing permission flag 326 to "OFF" (step S17). When the process of step S17 has been performed, the processing returns to step S1.

On the other hand, when having determined that the photographing has been successful (step S15: YES), that is, when recognition of peoples' faces has been successful in both the outer camera image 79 and the inner camera image 78, the information processing section 31 performs the face combination process of generating the left-eye combination image 80A and the right-eye combination image 80B (see FIG. 12) that are obtained by replacing the person's face included in the outer camera image 79 (here, the friend's face) with the person's face included in the inner camera image 78 (here, the user's face) (step S18).

After having generated the left-eye combination image 80A and the right-eye combination image 80B in the process of step S18, the information processing section 31 stores the left-eye combination image 80A and the right-eye combination image 80B as the face combination image data 331 in the data storage area 323 and also in the data storage external memory 46 (step S19). Then, the CPU 311, which functions as the first display control means and the second display control means, causes the face combination image 80 to be displayed on the upper LCD 22 in a stereoscopic manner for a predetermined time (e.g., 5 seconds) as exemplified in FIG. 9, using the left-eye combination image 80A and the right-eye combination image 80B indicated by the face combination image data 331 (step S20).

After the outer camera image 79 has been displayed in the left area 221 of the upper LCD 22 and the inner camera image 78 has been displayed in the right area 222 by performing the process of step S20 on the condition that the face combination image 80 had been generated, the face combination image 80 is displayed in one display area using both the left area 221 and the right area 222. When the process of step S20 has been performed, the processing returns to step S1 described above, and photographing for obtaining a face combination image becomes able to be performed again.

[Face Combination Process]

Figure 15:
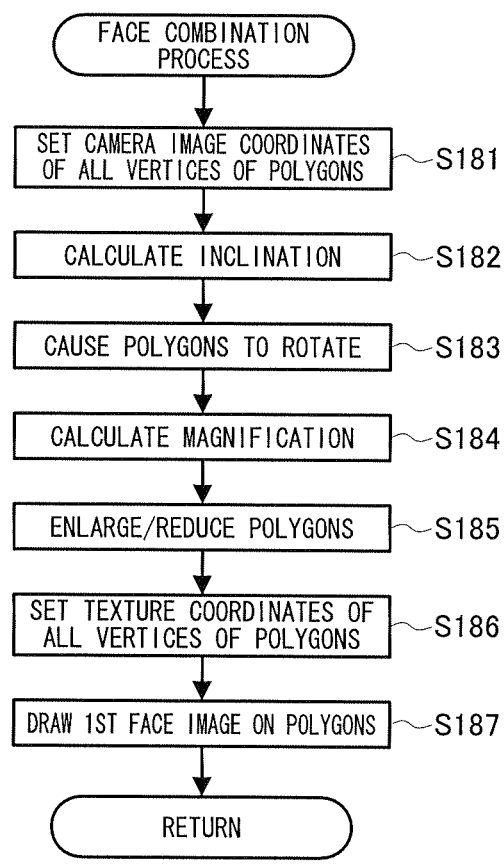
FIG. 15 is a non-limiting exemplary detailed flow chart of a face combination process in step S18 of FIG. 14.

FIG. 15 is a non-limiting exemplary detailed flow chart of the face combination process in step S18 of FIG. 14. When having determined in the process of step S15 described above that the photographing has been successful (step S15: YES), the information processing section 31 sets the camera image coordinates of all the vertices of the plurality of polygons PG1 and PG2 (step S181). Specifically, the CPU 311 acquires the position of the face in the inner camera image 78 and the positions of the feature points P1 through P16 (see FIG. 17) of the face, and also acquires the position of the face in the outer camera image 79 and the positions of the feature points P21 through P36 (see FIG. 19) of the face, using the inner camera image 78 and the outer camera image 79 indicated by the camera image data 324, and the face recognition result data 325. Then, the CPU 311 sets the positions of all the vertices (the camera image coordinates) of the plurality of polygons PG1 (see FIG. 18) on the basis of the positions of the feature points P1 through P16 in the inner camera image 78, and also sets the positions of all the vertices (the camera image coordinates) of the plurality of polygons PG2 (see FIG. 20) on the basis of the positions of the feature points P21 through P36 in the outer camera image 79. Then, the CPU 311 updates the camera image coordinate data 3302 corresponding to the plurality of polygons PG1 and the plurality of polygons PG2, using the set positions of all the vertices of the plurality of polygons PG1 and the plurality of polygons PG2. Here, the plurality of polygons PG1 and PG2 are set as triangles or rectangles on the basis of the plurality of feature points P1 through P16 and P21 through P36 of the recognized faces. Further, using known software, the feature points P1 through P16 and P21 through P36 of the faces are detected by performing image processing such as edge detection on the face images recognized in the captured camera images 78 and 79, respectively (the images indicated by the face areas 91 and 92), the feature points including the following 16 points in total in each face image: one point at the tip of the nose; four points at the eyebrows (two for each of the left and right ones); one point at the tip of the chin; and 10 points at the cheeks (five for each of the left and right ones). It should be noted that the positions of all the vertices of the plurality of polygons PG1 and PG2 may not need to coincide with those of the feature points P1 through P16 and P21 through P36 of the detected faces, and only need to be set at given positions on the basis of the positions of the feature points P1 through P16 and P21 through P36.

As described above, the camera image coordinates of all the vertices of the plurality of polygons PG1 are set in the process of step S181. Consequently, the face area 91 is detected from the face areas 91 and 92 included in the inner camera image 78 and the outer camera image 79, respectively, displayed on the upper LCD 22.

Figure 16:
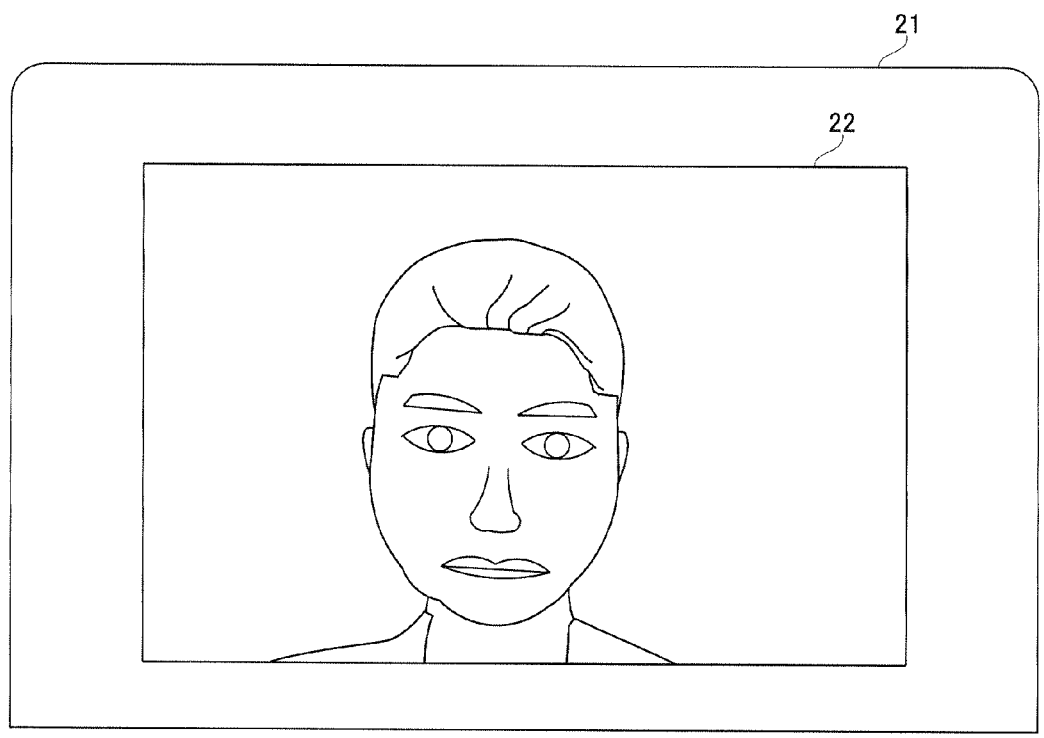
FIG. 16 is a screen view of the upper LCD 22 showing an example of a face combination image obtained by combining a first face image 81 as it is with an outer camera image 79.

Incidentally, as exemplified in FIG. 11, there is a case where the inclination of the user's face indicated by the face area 91 detected from the inner camera image 78 is different from the inclination of the friend's face indicated by the face area 92 detected from the outer camera image 79. This is caused, for example, by the difference in orientation between the user and the friend when the photographing has been performed. Further, there is also a case where the face area 91 and the face area 92 are different from each other in size. This is caused not only by the difference in relative size of face between the user and the friend, but also by the difference between: the distance between the inner capturing section 24 and the user's face; and the distance between the outer capturing section 23 and the friend's face, when the photographing has been performed. Accordingly, if a face combination image is generated by placing the first face image 81 corresponding to the face area 91 as it is in the face area 92, a face combination image representing, as shown in FIG. 16, a face that is interesting but very unnatural is obtained. In the example of FIG. 16, the face represented by the first face image 81 is inclined relative to the face indicated by the face area 92. Thus, the face is unnaturally inclined relative to the friend's hair and upper body. Further, the face area 91 is large relative to the face area 92. Thus, parts of the friend's ears, neck, hair, and the like are hidden behind the face.

In response, in the present embodiment, when the first face image 81 is combined with the outer camera image 79 (79A and 79B), the rotation process and the enlargement/reduction process are performed on the first face image 81.

Returning to the description of FIG. 15, after having set the camera image coordinates of all the vertices of the polygons PG1 and PG2 in the process of step S181, the CPU 311 calculates the inclination of the face in the face area 91 (see FIG. 11) relative to the face in the face area 92 (see FIG. 11) (step S182). Specifically, the CPU 311 obtains the inclination of the face in the face area 91 relative to the horizontal direction by calculating the inclination of the line segment α whose both ends are the left-eye central point A1 and the right-eye central point A2 of the face area 91. Further, the CPU 311 obtains the inclination of the face in the face area 92 relative to the horizontal direction by calculating the inclination of the line segment β whose both ends are the left-eye central point B1 and the right-eye central point B2 of the face area 92. Then, after having updated the inclination data 3304 using the two inclinations, the CPU 311 calculates the inclination of the face in the face area 91 relative to the face in the face area 92 by obtaining the difference between the two inclinations.

Next, the CPU 311 causes the polygons PG1 to rotate (step S183). To cause the face included in the face area 91 to rotate, it is necessary to move by rotation the positions of the feature points P1 through P16 that define the face area 91. As described above, when the positions of the feature points P1 through P16 of the face area 91 have been changed, it is necessary to move by rotation also the positions of all the vertices of the polygons PG1 set on the basis of the feature points P1 through P16. In response, in step S183, the CPU 311 changes the camera image coordinates of all the vertices of the plurality of polygons PG1 set in the process of step S181, to those of the positions resulting from the rotation movements made in accordance with the inclination calculated in the process of step S182, to thereby update the camera image coordinate data 3302 using the camera image coordinates after the change.

The performance of the process of step S183 corrects the camera image coordinates of all the vertices of the polygons PG1 such that the inclination of the user's face represented by the polygons PG1 approximately coincides with the inclination of the friend's face (the inclination of the face included in the face area 92).

Figure 17:
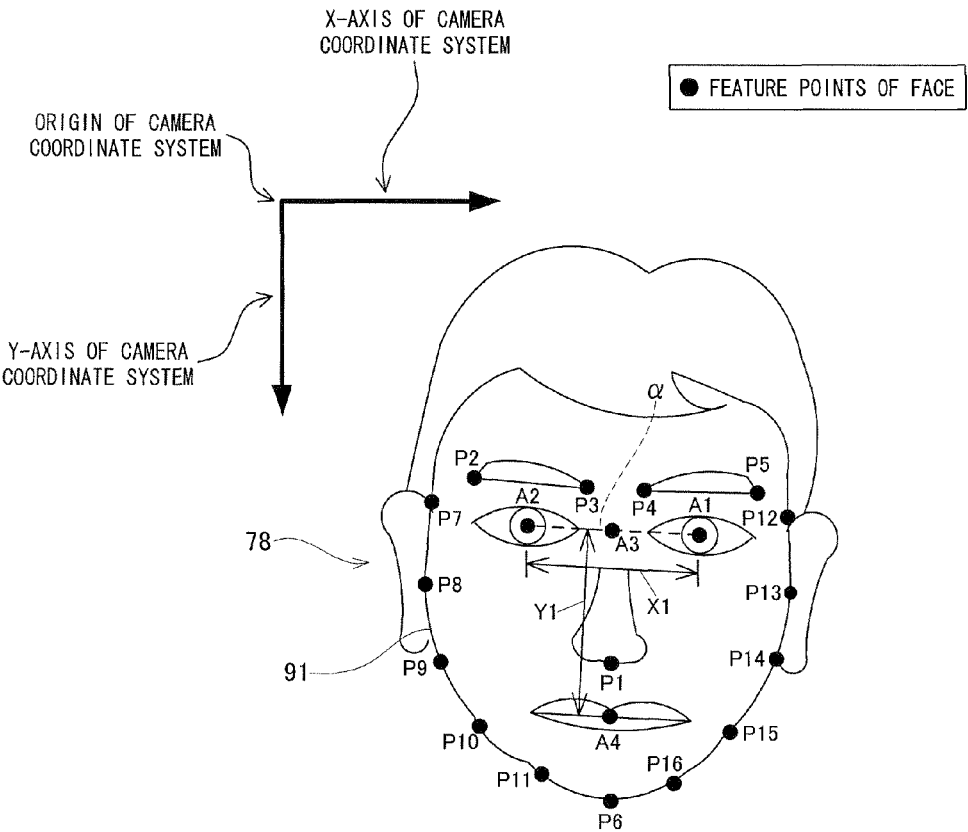
FIG. 17 is a non-limiting exemplary diagram illustrating feature points P1 through P16 that define the face area 91.
Figure 18:
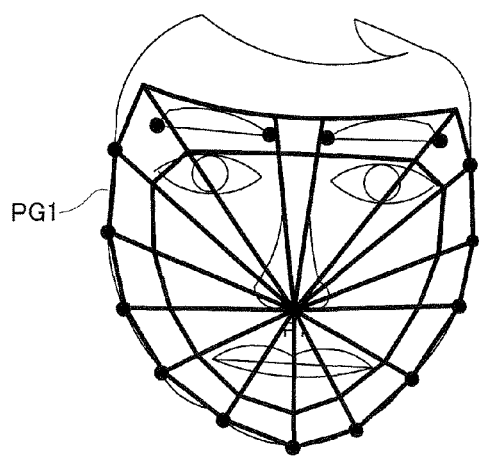
FIG. 18 is a non-limiting exemplary diagram illustrating a plurality of polygons PG1.
Figure 19:
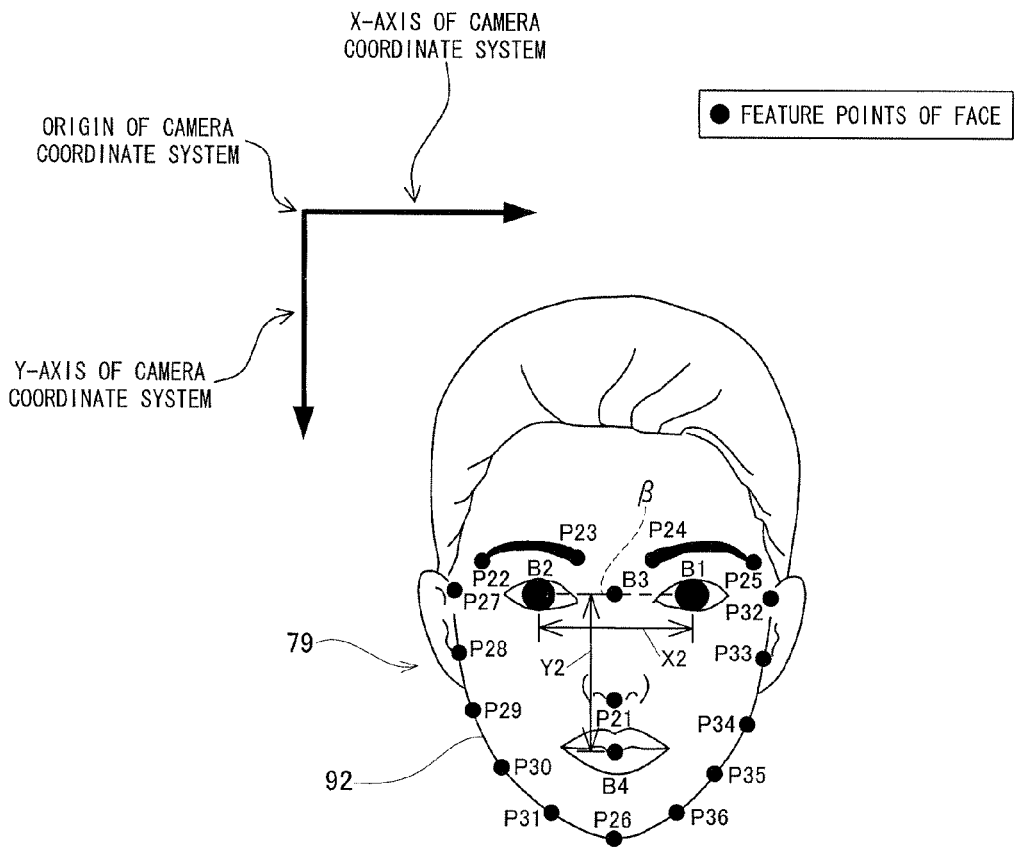
FIG. 19 is a non-limiting exemplary diagram illustrating feature points P21 through P36 that define the face area 92.
Figure 20:
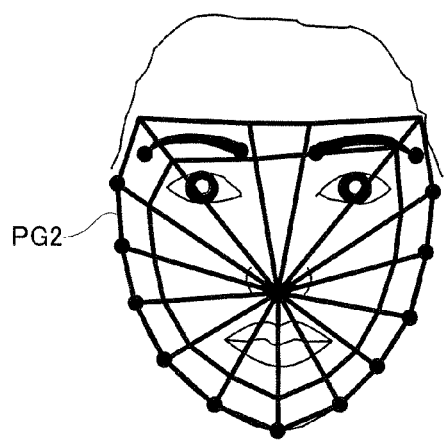
FIG. 20 is a non-limiting exemplary diagram illustrating a plurality of polygons PG2.

Subsequently to the process of step S183, the CPU 311 calculates a magnification (an enlargement ratio or a reduction ratio) for changing the sizes of the polygons PG1 (step S184). Specifically, the CPU 311 calculates, as shown in FIG. 17, the horizontal size X1 and the vertical size Y1 of the face area 91 on the basis of data indicating the face area 91 (see FIG. 11) that is included in the face recognition result data 325 (here, data indicating the positions of the points A1 through A4). Further, the CPU 311 calculates, as shown in FIG. 19, the horizontal size X2 and the vertical size Y2 of the face area 92 on the basis of data indicating the face area 92 (see FIG. 11) that is included in the face recognition result data 325 (here, data indicating the positions of the points B1 through B4). Then, the CPU 311 updates the size data 3303 on the basis of the calculated sizes of the face areas 91 and 92. Subsequently, with reference to the size data 3303, the CPU 311 calculates an approximate value of the magnification (the enlargement ratio or the reduction ratio) of the polygons PG1 such that the horizontal size X1 and the horizontal size X2 approximately coincide with each other, and the vertical size Y1 and the vertical size Y2 approximately coincide with each other. In the present embodiment, as is clear from the above description, the face area 91 is larger than the face area 92, and therefore, the reduction ratio is calculated here.

Next, the CPU 311 enlarges or reduces the polygons PG1 in accordance with the magnification calculated in the process of step S184 (step S185). When the face area 91 is enlarged or reduced such that the face area 91 approximately coincides in size with the face area 92, the distances between the feature points P1 through P16 that define the face area 91 change. This makes it necessary to change the positions of all the vertices of the polygons PG1 set on the basis of the positions of the feature points P1 through P16. In response, in step S185, with reference to the camera image coordinate data 3302, the CPU 311 changes the camera image coordinates of all the vertices of the plurality of polygons PG1 changed in the process of step S183, to those of the positions resulting from the movements made by enlarging or reducing the polygons PG1 with the magnification calculated in the process of step S184, to thereby update the camera image coordinate data 3302 using the camera image coordinates after the change.

As described above, when the first face image 81 has been placed in the face area 92 of the outer camera image 79 by changing the inclinations and the sizes of the plurality of polygons PG1, it is possible to prevent the obtaining of an unnatural face combination image. It should be noted that, here, the enlargement or reduction process is performed on the plurality of polygons PG1 after the rotation process has been performed on the plurality of polygons PG1. Alternatively, the rotation process may be performed on the plurality of polygons PG1 after the enlargement or reduction process has been performed on the plurality of polygons PG1.

Subsequently, with reference to the camera image coordinate data 3302, the CPU 311 sets the positions (the texture coordinates) of all the vertices of the polygons PG1 to thereby update the texture coordinate data 3301 of the polygons PG1 on the basis of the set positions of all the vertices (step S186).

Then, the CPU 311, which functions as face combination image generation means, draws the first face image 81 on the polygons PG1 (step S187). Specifically, the information processing section 31 generates textures to be mapped onto the plurality of polygons PG1, respectively, on the basis of the image in the face area 91, to thereby update the texture data 329. Then, the information processing section 31 maps the textures of the first face image 81 indicated by the texture data 329 onto the plurality of polygons PG1, respectively, on the basis of the texture coordinates of all the vertices indicated by the texture coordinate data 3301. Then, with reference to the face recognition result data 325, the information processing section 31 draws the plurality of polygons PG1 in the VRAM 313 by placing them such that a reference point of the plurality of polygons PG1 (the midpoint A3 shown in FIG. 17) coincides with a reference point of the plurality of polygons PG2 (the midpoint B3 shown in FIG. 19). At this time, alpha values indicating the transparencies of pixels are set to "0" at all the vertices of the polygons PG1 in order to reduce a feeling of discomfort between a peripheral portion of the first face image 81 and the image outside the face area 92 in the outer camera image 79.

As described above, the first face image 81 is acquired using the outer camera image 79 and the inner camera image 78 acquired by the outer capturing section 23 and the inner capturing section 24, respectively, in accordance with the operation on the L button 14G or the R button 14H. Subsequently, the rotation process and the enlargement/reduction process are performed on the first face image 81, and the face combination image 80 is generated that is obtained by, in the outer camera image 79, replacing the image in the face area 92 with the first face image 81 subjected to the processes. The face combination image 80 thus generated is displayed on the upper LCD 22 instead of the outer camera image 79 and the inner camera image 78 (see FIG. 9), as a result of the completion of the process of step S187 and the performance of the process of step S20.

[Operation and Effect of the Present Embodiment]

As described above, based on the present embodiment, the first face image 81 representing the user's face is acquired in the state where the faces of two people, namely the friend and the user, are captured in real time as subjects by the outer capturing section 23 and the inner capturing section 24, respectively, and are displayed on the upper LCD 22 (see FIG. 8, for example). Then, the face combination image 80 is generated that is obtained by replacing the face area 92 (see FIG. 11) corresponding to the friend's face with the first face image 81 subjected to the rotation process and the enlargement/reduction process. This makes it possible to obtain not camera images obtained by a realistic reproduction of peoples' faces as subjects, but an interesting captured image obtained by combining the faces of a plurality of people together.

In addition, in the present embodiment, the display of camera images obtained by faithfully reproducing the user's face and the friend's face as subjects is switched to the interesting face combination image 80. This enables the user to easily confirm the face combination image 80 by viewing the upper LCD 22. In the present embodiment, the display contents of the upper LCD 22 are switched from the camera images to the face combination image 80 at the time when an instruction has been given on photographing. This makes it possible to easily confirm the face combination image 80 without performing, immediately after the photographing has been performed, the operation of causing the face combination image 80 to be displayed, and this improves the enjoyment of photographing.

In addition, in the present embodiment, the face combination image 80 is generated that is obtained by replacing the friend's face represented by the outer camera image, with the user's face represented by the inner camera image. This enables the user to enjoy photographing by comparing the friend's face present in real space (present in front of the user) with the face represented by the face combination image 80.

In addition, in the present embodiment, when the L button 14G or the R button 14H has been operated, a series of processes, from the acquisition of the first face image 81 to the generation of the face combination image 80, are performed. That is, it is possible to obtain the face combination image 80 immediately after photographing has been performed. This enables, as described in the present embodiment, the user and the friend to easily view the face combination image 80 by causing the face combination image 80 to be displayed on the upper LCD 22 immediately after photographing has been performed, and this enables the user and the friend to enjoy photographing together.

In addition, in the present embodiment, the game apparatus 10 is configured not to allow the shutter to be pressed (not to permit photographing), unless recognition of peoples' faces has been successful in both the outer camera image and the inner camera image in order to obtain the face combination image 80. This requires a plurality of people (two people, namely the user and the friend, in the present embodiment) to cooperate to perform photographing in order to make a success of the face recognition processes. This makes it possible to further enjoy photographing.

In addition, in the present embodiment, while the friend's face and the user's face are included in the capturing ranges of the outer capturing section 23 and the inner capturing section 24, the balloons 74 and 75 are displayed on the upper LCD 22 in order to notify that photographing can be performed. This enables the user to easily understand at what time the L button 14G or the R button 14H is to be operated to make a success of photographing for obtaining the face combination image 80, and this enables the user to smoothly perform photographing.

In addition, in the present embodiment, the camera images captured by the two capturing sections 23 and 24, respectively, are displayed separately in different display areas of the upper LCD 22 such that the outer camera image is displayed in the left area 221 of the upper LCD 22 and the inner camera image is displayed in the right area 222. This enables the user to easily confirm whether or not faces are included in the capturing ranges of the capturing sections 23 and 24, and this makes it possible to smoothly perform photographing.

In addition, in the present embodiment, the generation of the face combination image 80 automatically switches the display contents of the upper LCD 22 from the outer camera image 79 and the inner camera image 78 to the face combination image 80. This enables the user to enjoy viewing the switching of the display contents.

In addition, in the present embodiment, both the outer capturing section 23 and the inner capturing section 24 are used to obtain the face combination image 80. This makes it possible that the user of the game apparatus 10 performs photographing in the state where the user faces the friend, while confirming whether or not faces are displayed in both the left area 221 and the right area 222, and, immediately after the photographing has been performed, the user and the friend confirm together the face combination image 80 displayed on the upper LCD 22. This enables the user and the friend to cooperate to perform, and enjoy, photographing.

[Other Photographing Methods]

In the above embodiment, as described on the basis of FIG. 5, the description is given of the case where the user's face is captured by the inner capturing section 24 and the friend's face is captured by the outer capturing section 23. The number of people captured by one capturing section, however, is not limited to one.

Figure 21:
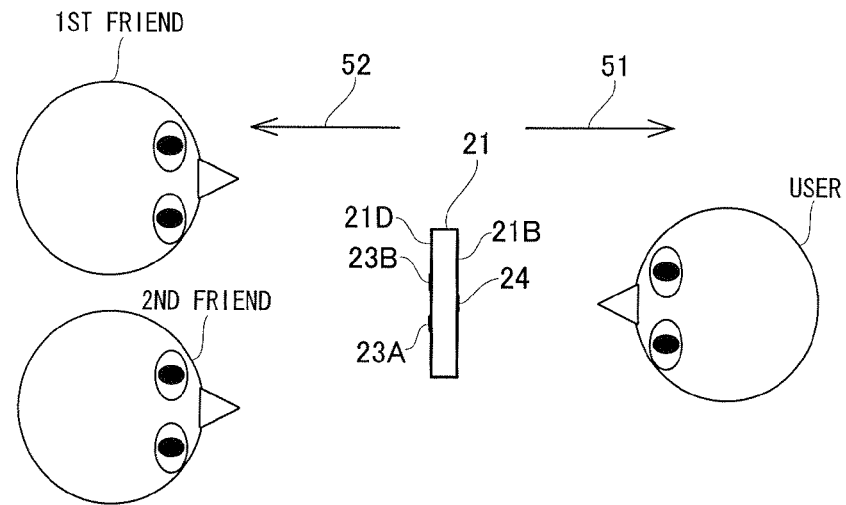
FIG. 21 is a non-limiting exemplary diagram illustrating another photographing method using the game apparatus 10.

FIG. 21 is a non-limiting exemplary schematic diagram showing a photographing method performed in the case where three people, namely the user and two friends, perform photographing using both the outer capturing section 23 and the inner capturing section 24. As exemplified in FIG. 21, the three people may cooperate to perform photographing such that the user of the game apparatus 10 is captured by the inner capturing section 24 and the remaining two people, namely a first friend and a second friend, are captured by the outer capturing section 23. In this case, it is possible to perform a face combination process of: acquiring a first face image representing the user's face from the inner camera image; and inserting two first face images into the face area of the two friends included in the outer camera image. This face combination process makes it possible to obtain an interesting face combination image obtained by replacing both the faces of two people, namely the first friend and the second friend, with the user's face (by providing both friends with the face of a different person).

Figure 22:
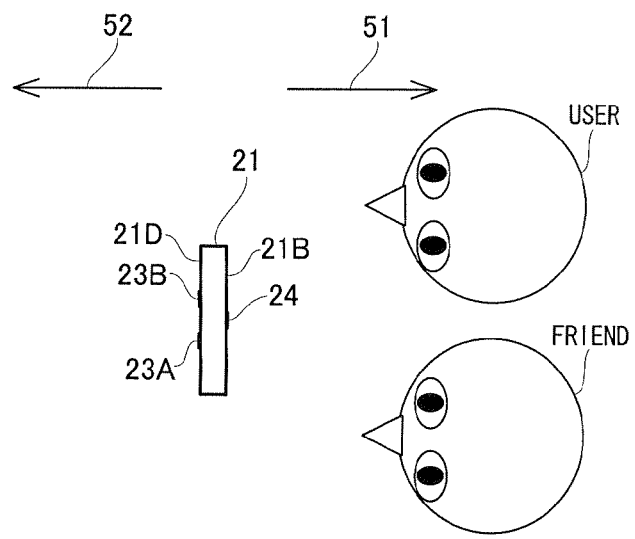
FIG. 22 is a non-limiting exemplary diagram illustrating another photographing method using the game apparatus 10.

FIG. 22 is a non-limiting exemplary schematic diagram showing a photographing method performed in the case where two people, namely the user and a friend, perform photographing using only the inner capturing section 24. As exemplified in FIG. 22, the user of the game apparatus 10 and the friend may perform photographing side by side such that both the user and the friend are captured by the inner capturing section 24. In this case, it is possible to perform a face combination process of: acquiring a first face image representing the friend's face from the inner camera image; and inserting the first face image into the face area of the user in the same inner camera image. This face combination process makes it possible to obtain an interesting face combination image obtained by replacing both the faces of two people, namely the user and the friend, with the friend's face. As described above, the faces of a plurality of people may be photographed using either one of the outer capturing section 23 and the inner capturing section 24, and a face combination image may be obtained from one camera image obtained by the photographing.

[Variations]

It should be noted that the exemplary embodiments are not limited to the above embodiment, and may be the following forms. That is, in the above embodiment, the description is given of the case where the face combination image 80 is obtained by replacing the entirety of the face area 92 of the friend (an example of the second face area) with the first face image 81 corresponding to the entirety of the face area 91 of the user (an example of the first face area). Instead of this, an image of a part of the first face area may be acquired as a first face image, and a part of the second face area may be replaced with the first face image. That is, a face combination image may be generated that is obtained by replacing a part (e.g., the eyes) of a person's face with a part (the eyes, likewise) of another person's face.

In addition, in the above embodiment, the description is given of the case where a face combination image is generated that is obtained by replacing a person's face indicated by the outer camera image, with a person's face indicated by the inner camera image. Alternatively, conversely, a face combination image may be generated that is obtained by replacing a person's face indicated by the inner camera image, with a person's face indicated by the outer camera image. This enables a person photographed by the outer capturing section 23 to enjoy photographing together with the user by comparing the face of the user of the game apparatus 10 who is performing photographing in front of the person, with, for example, a face combination image displayed on the upper LCD 22 after the photographing.

In addition, in the above embodiment, the description is given of the case where the face combination image 80 (the left-eye combination image 80A and the right-eye combination image 80B) to be displayed in a stereoscopic manner is obtained using the outer capturing section 23 as a stereo camera. Alternatively, a face combination image to be displayed in a planar manner may be obtained using the outer capturing section 23 as a non-stereo camera. Examples of this form include the form of obtaining a face combination image by, using only the left outer capturing section 23A of the outer capturing section 23, combining one outer camera image acquired by the left outer capturing section 23A with a first face image included in the inner camera image acquired by the inner capturing section 24.

In addition, in the above embodiment, the description is given of the case where the outer camera image and the inner camera image acquired in real time are displayed in different display areas of the upper LCD 22. Alternatively, the camera images may be displayed using both the upper LCD 22 and the lower LCD 12. That is, the outer camera image may be displayed on the upper LCD 22, and the inner camera image may be displayed on the lower LCD 12.

In addition, in the above embodiment, the description is given of the case where the face combination image 80 is displayed on the upper LCD 22. Alternatively, the face combination image 80 may be displayed on the lower LCD 12. For example, if the inner camera image 78 and the outer camera image 79 are continuously displayed on the upper LCD 22 even after photographing, it is possible to compare the camera images 78 and 79 obtained at the time of the photographing, with the face combination image 80. Further, the face combination image 80 may be displayed on the screen of a liquid crystal television connected to the game apparatus 10 so as to communicate therewith.

In addition, in the above embodiment, the description is given of the case where a face combination image is generated by acquiring a first face image (the first face image 81 in the above embodiment) in accordance with the operation on the L button 14G or the R button 14H. Instead of this, a process may be automatically performed of generating a face combination image by acquiring a first face image. For example, it is possible to perform the face recognition processes on the outer camera image and the inner camera image acquired in real time, and generate a face combination image by acquiring a first face image at the time when recognition of faces has been successful in both camera images.

In addition, in the above embodiment, the description is given of the case where photographing is prohibited when a plurality of faces are not included in the capturing ranges of the capturing sections. Photographing may be allowed regardless of whether or not a plurality of faces are included in the capturing ranges. In this case, however, there is a case where a face combination image cannot be obtained depending on the positions of faces relative to the game apparatus 10. Accordingly, it is preferable that as described in the above embodiment, photographing should be allowed on the condition that the face recognition processes have been successful.

In addition, in the above embodiment, the descriptions are given, by way of example, of the case where the exemplary embodiments are applied to the hand-held game apparatus 10. Alternatively, the exemplary embodiments may be applied to not only a game apparatus but also a given hand-held electronic device such as a personal digital assistant (PDA) or a mobile phone.

In addition, in the above embodiment, the description is given, by way of example, of the case where the game apparatus 10 performs all of the processing until a face combination image is obtained. Alternatively, some of the processing may be performed by another device. For example, when the game apparatus 10 is connected to another device so as to communicate therewith (e.g., a server or another game apparatus), the process steps in the main process described above may be performed by the cooperation of the game apparatus 10 and said another device as one capturing system. Further, in the above embodiment, the processing of the non-limiting exemplary flow chart described above is performed in accordance with the execution of a predetermined program by the information processing section 31 of the game apparatus 10. Alternatively, some or all of the processing may be performed by a dedicated circuit provided in the game apparatus 10.

In addition, the shape of the game apparatus 10, the number of capturing sections, the placements of capturing sections, the capturing directions of capturing sections, and the like are merely illustrative, and it is needless to say that the exemplary embodiments can be achieved with other shapes, numbers, placements, and the like. Further, the processing orders, the setting values, the criterion values, and the like that are used in the main process described above are also merely illustrative, and it is needless to say that the exemplary embodiments can be achieved with other orders and values.

In addition, the image generation program may be supplied to the game apparatus 10 not only from an external storage medium, such as the external memory 45 or the data storage external memory 46, but also via a wireless or wired communication link. Further, the image generation program may be stored in advance in a non-volatile storage device of the game apparatus 10. It should be noted that examples of an information storage medium having stored thereon the program may include a CD-ROM, a DVD, and another given optical disk storage medium similar to these, a flexible disk, a hard disk, a magnetic optical disk, and a magnetic tape, as well as a non-volatile memory. Furthermore, the information storage medium for storing the program may be a volatile memory that temporarily stores the program, such as a RAM.

The exemplary embodiments can be applied to a computer-readable storage medium having stored thereon an image generation program to be executed by a computer of a capturing apparatus that uses a face recognition function to perform image processing on a captured image obtained by capturing the face of a person or the like, a capturing apparatus, a capturing system, an image generation method, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored thereon an image generation program to be executed by a computer of a capturing apparatus, the image generation program causing the computer to perform:
    acquiring a captured image in real time with at least one capturing section;
    detecting a first face area from a plurality of face areas included in the acquired captured image, and acquiring an image in at least a part of the first face area as a first face image; and
    generating a face combination image by replacing at least a part of a second face area with the first face image, the second face area being included in the plurality of face areas and different from the first face area.

2. The non-transitory computer-readable storage medium having stored thereon the image generation program according to claim 1, the image generation program further causing the computer to perform:
    causing the captured image acquired in real time to be displayed on a display, and causing the face combination image to be displayed on the display in place of the captured image on a condition that the face combination image has been generated.

3. The non-transitory computer-readable storage medium having stored thereon the image generation program according to claim 1, wherein
    using the acquired captured image in accordance with a predetermined operation, a process is performed in which the computer performs acquiring of the first face image, and a process is performed in which the computer performs generating of the face combination image.

4. The computer-readable storage medium having stored thereon the image generation program according to claim 3, the image generation program further causing the computer to perform:
    determining, on the basis of the captured image acquired in real time, whether or not a plurality of faces are included as subjects in a capturing range of the at least one capturing section; and
    while the determination determines that a plurality of faces are not included in the capturing range, prohibiting photographing from being performed in accordance with the predetermined operation.

5. The non-transitory computer-readable storage medium having stored thereon the image generation program according to claim 4, the image generation program further causing the computer to perform:
    while the determination determines that a plurality of faces are included in the capturing range, notifying that photographing can be performed in accordance with the predetermined operation.

6. The non-transitory computer-readable storage medium having stored thereon the image generation program according to claim 1, the image generation program further causing the computer to perform:
    causing a first captured image captured by a first capturing section to be displayed in a first display area of a display, and causing a second captured image captured by a second capturing section to be displayed in a second display area of the display, the second display area being different from the first display area.

7. The non-transitory computer-readable storage medium having stored thereon the image generation program according to claim 6, wherein
on a condition that the face combination image has been generated, the computer is further configured to cause the face combination image to be displayed on the display in place of the first captured image and the second captured image.

8. The non-transitory computer-readable storage medium having stored thereon the image generation program according to claim 6, wherein
a capturing direction of either one of the first capturing section and the second capturing section coincides with a normal direction of the display, and a capturing direction of the other of the first capturing section and the second capturing section coincides with a direction opposite to the normal direction.

9. A capturing apparatus comprising:
a captured image acquisition unit for acquiring a captured image in real time with at least one capturing section;
a face image acquisition unit for detecting a first face area from a plurality of face areas included in the captured image acquired by the captured image acquisition unit, and acquiring an image in at least a part of the first face area as a first face image; and
a face combination image generation unit for generating a face combination image by replacing at least a part of a second face area with the first face image, the second face area being included in the plurality of face areas and different from the first face area.

10. A capturing system comprising:
a captured image acquisition unit for acquiring a captured image in real time with at least one capturing section;
a face image acquisition unit for detecting a first face area from a plurality of face areas included in the captured image acquired by the captured image acquisition unit, and acquiring an image in at least a part of the first face area as a first face image; and
a face combination image generation unit for generating a face combination image by replacing at least a part of a second face area with the first face image, the second face area being included in the plurality of face areas and different from the first face area.

11. An image generation method to be performed by a capturing apparatus, the image generation method comprising:
acquiring a captured image in real time with at least one capturing section;
detecting a first face area from a plurality of face areas included in the acquired captured image, and acquiring an image in at least a part of the first face area as a first face image; and
generating a face combination image by replacing at least a part of a second face area with the first face image, the second face area being included in the plurality of face areas and different from the first face area.

* * * * *